United States Patent
Malhotra et al.

[11] Patent Number: 5,909,346
[45] Date of Patent: Jun. 1, 1999

[54] THIN MAGNETIC FILM INCLUDING MULTIPLE GEOMETRY GAP STRUCTURES ON A COMMON SUBSTRATE

[75] Inventors: Arun Malhotra, San Jose; G. Robert Gray, Fremont, both of Calif.

[73] Assignee: Aiwa Research & Development, Inc., Fremont, Calif.

[21] Appl. No.: 08/882,370

[22] Filed: Jun. 25, 1997

Related U.S. Application Data

[63] Continuation of application No. 08/763,653, Dec. 11, 1996, abandoned, which is a continuation of application No. 08/296,617, Aug. 26, 1994, abandoned.

[51] Int. Cl.⁶ .................................................. G11B 5/147
[52] U.S. Cl. ............................................................ 360/126
[58] Field of Search .................................. 360/121, 122, 360/126, 119

[56] References Cited

U.S. PATENT DOCUMENTS

| | | | |
|---|---|---|---|
| 3,723,665 | 3/1973 | Lazzari et al. | 179/100.2 C |
| 4,157,616 | 6/1979 | Bischoff | 360/126 |
| 4,414,554 | 11/1983 | Springer | 346/74.5 |
| 4,470,051 | 9/1984 | Springer | 346/74.5 |
| 4,494,125 | 1/1985 | Springer | 346/74.5 |
| 4,503,439 | 3/1985 | Springer | 346/74.5 |
| 4,503,440 | 3/1985 | Springer | 346/74.5 |
| 4,539,280 | 9/1985 | Springer | 430/39 |
| 4,544,421 | 10/1985 | Springer | 148/103 |
| 4,639,289 | 1/1987 | Lazzari | 156/643 |
| 4,731,157 | 3/1988 | Lazzari | 29/603.25 |
| 4,809,103 | 2/1989 | Lazzari | 360/126 |
| 4,837,924 | 6/1989 | Lazzari | 29/603 |
| 4,899,434 | 2/1990 | Roberts | 29/603.25 |
| 4,901,177 | 2/1990 | Lazzari | 360/113 |
| 4,912,584 | 3/1990 | Mallary et al. | 360/126 |
| 4,942,490 | 7/1990 | Lehureau | 360/126 |
| 4,949,207 | 8/1990 | Lazzari | 360/119 |
| 4,970,615 | 11/1990 | Gau | 360/122 |
| 4,984,118 | 1/1991 | Springer | 360/125 |
| 4,992,897 | 2/1991 | Deroux-Dauphin | 360/103 |
| 5,020,212 | 6/1991 | Michijima et al. | 29/603 |

(List continued on next page.)

OTHER PUBLICATIONS

A. Sano, M. Egawa, M. Nitta, K. Takayanagi, T. Matsushita, and T. Fujita, A Low Inductance Metal–In–Gap Head Using a Side–Core Concept, ©1993, IEEE Transactions on Magnetics, vol. 29, No. 6, pp. 3888–3890.

K.L. Mittal, Factors Affecting Adhesion of Lithographic Materials, Solid State Technology, May 1979, pp. 89–100.

J.P. Lazzari and P. Deroux–Dauphin, A New Thin Film Head Generation IC Head, IEEE Transactions on Magnetics, vol. 25, No. 5, Sep. 1989, pp. 3173–3193.

*Primary Examiner*—Brian E. Miller
*Attorney, Agent, or Firm*—Skjerven, Morrill MacPherson, Franklin & Friel, L.L.P.; Ken J. Koestner

[57] ABSTRACT

A thin film magnetic head assembly is provided which includes a plurality of thin film heads situated atop a common substrate. An insulative main body is built up layer by layer on the substrate. A plurality of magnetic yokes exhibiting different geometries are situated on the substrate and within the main body. The magnetic yokes are built up layer by layer at the same time that the insulative main body is fabricated. A plurality of coil structures are situated within the main body and are magnetically coupled to respective magnetic yokes. The head assembly also includes a pedestal of insulative material situated atop the main body and exhibiting a lateral dimension less than that of the main body. The pedestal protrudes upwardly away from the main body and substrate. The magnetic yokes each include a pole piece pair situated atop the pedestal, each pole piece pair including first and second magnetic pole pieces. Each pole piece pair exhibits a different geometry than another pole piece pair. Each pole piece pair forms a head which is adapted to reading/writing a track on a magnetic medium, the tracks of which are compatible with the geometry of that pole piece pair.

12 Claims, 21 Drawing Sheets

U.S. PATENT DOCUMENTS

| | | | |
|---|---|---|---|
| 5,041,932 | 8/1991 | Hamilton | 360/104 |
| 5,065,271 | 11/1991 | Matsuura et al. | 360/126 |
| 5,073,242 | 12/1991 | Hamilton | 204/192.22 |
| 5,090,111 | 2/1992 | Lazzari | 29/603 |
| 5,111,351 | 5/1992 | Hamilton | 360/104 |
| 5,122,917 | 6/1992 | Springer | 360/126 |
| 5,123,156 | 6/1992 | Meunier et al. | 29/603.15 |
| 5,155,646 | 10/1992 | Fujisawa et al. | 360/103 |
| 5,163,218 | 11/1992 | Hamilton | 29/603 |
| 5,166,845 | 11/1992 | Thompson et al. | 360/103 |
| 5,168,408 | 12/1992 | Lazzari | 360/113 |
| 5,175,658 | 12/1992 | Chang et al. | 360/103 |
| 5,189,580 | 2/1993 | Pisharody et al. | 360/126 |
| 5,195,006 | 3/1993 | Morikawa | 360/126 |
| 5,196,976 | 3/1993 | Lazzari | 360/113 |
| 5,198,948 | 3/1993 | Stover et al. | 360/124 |
| 5,202,863 | 4/1993 | Miyatake et al. | 369/13 |
| 5,208,716 | 5/1993 | Lazzari | 360/113 |
| 5,216,559 | 6/1993 | Springer | 360/106 |
| 5,224,260 | 7/1993 | Fedeli et al. | 29/603 |
| 5,260,845 | 11/1993 | Takayama et al. | 360/103 |
| 5,266,409 | 11/1993 | Schmidt et al. | 428/446 |
| 5,274,521 | 12/1993 | Miyauchi et al. | 360/119 |
| 5,285,341 | 2/1994 | Suzuki et al. | 360/121 |
| 5,331,494 | 7/1994 | Fukuda et al. | 360/103 |
| 5,384,195 | 1/1995 | Bachmann et al. | 360/122 |
| 5,406,434 | 4/1995 | Amin et al. | 360/126 |
| 5,406,695 | 4/1995 | Amemori | 360/122 |
| 5,490,028 | 2/1996 | Ang et al. | 360/126 |
| 5,563,754 | 10/1996 | Gray et al. | 360/126 |
| 5,737,825 | 4/1998 | Gray et al. | 360/126 |
| 5,748,417 | 5/1998 | Malhotra et al. | 360/126 |
| 5,754,377 | 5/1998 | Gray et al. | 360/126 |

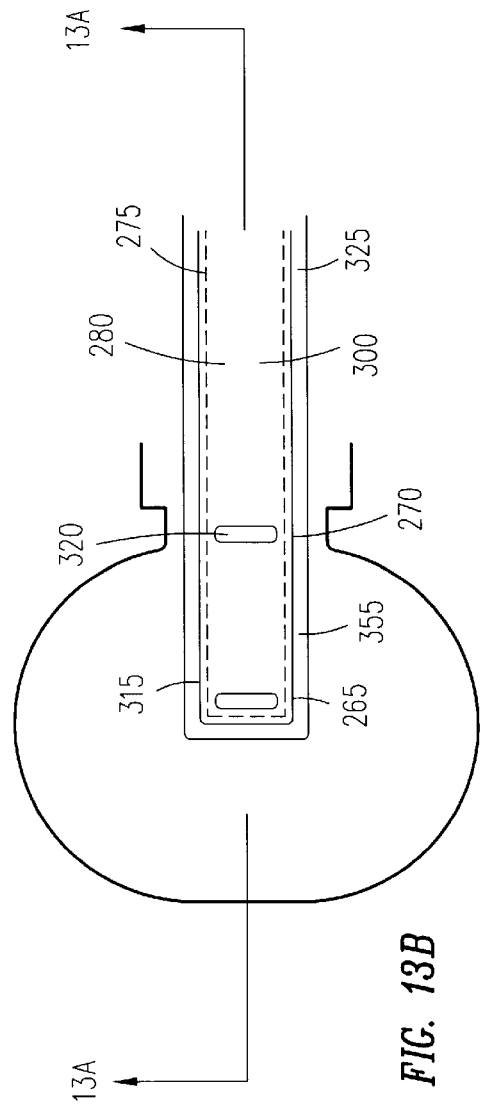
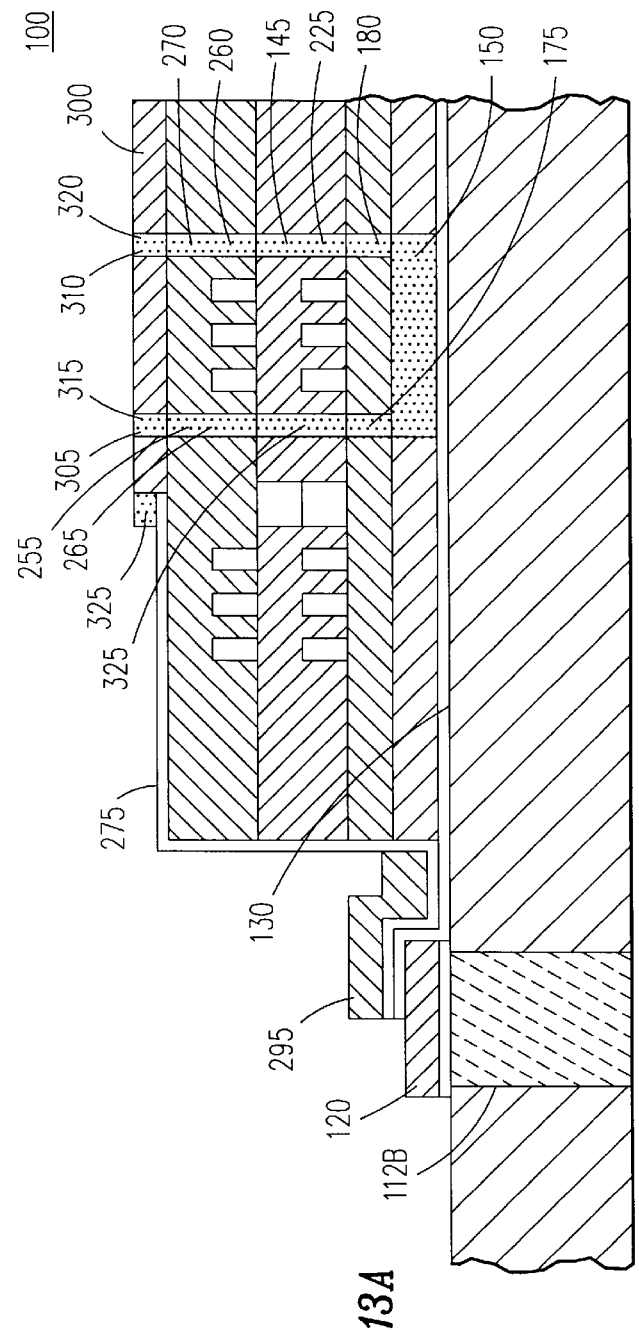
FIG. 13B
FIG. 13A

THIN MAGNETIC FILM INCLUDING MULTIPLE GEOMETRY GAP STRUCTURES ON A COMMON SUBSTRATE This application is a continuation of application Ser. No. 8/763,653, filed Dec. 11, 1996, now abandoned, which in turn is a continuation of application Ser. No. 08/296,617, filed Aug. 26, 1994, now abandoned.

CROSS REFERENCE TO RELATED PATENT APPLICATIONS

This patent application is related to the copending patent application entitled "METHOD OF FABRICATING A THIN FILM MAGNETIC HEAD INCLUDING LAYERED MAGNETIC SIDE POLES", (U.S. patent application Ser. No. 08/297,186) by Malhotra et al., filed concurrently herewith and assigned to the same assignee, the disclosure of which is incorporated herein by reference.

BACKGROUND OF THE INVENTION

1. Field of the Invention

This invention relates in general to magnetic recording and playback heads and, more particularly, to thin film magnetic recording and playback heads.

2. Description of Related Art

In the continuing drive for increased storage density in magnetic media storage devices, thin film magnetic heads have been developed. As opposed to earlier types of magnetic heads, the fabrication of which involves significant piecework and manual handling of individual parts, thin film magnetic heads take advantage of semiconductor fabrication processes to form a large number of heads simultaneously on a common substrate or wafer.

One such head which is formed by a, semiconductor thin film process is disclosed in the article, "A New Thin Film Head Generation IC Head" by J. P. Lazzari et al., IEEE Transactions on Magnetics, Vol. 25, No. 5, September 1989. A cross-sectional view of the Lazzari head is illustrated in FIG. 1 as head 10. Head 10 is fabricated within a recess 15 in a silicon substrate 20. A gap 25 is shown in the uppermost portion of a magnetic layer or yoke 30 situated within recess 15. Head 10 is shown positioned adjacent magnetic recording media 35. A magnetic coil 40 is wound around magnetic yoke 30. A plurality of sliders with respective heads 10 thereon are fabricated from a common silicon wafer substrate using semiconductor thin film processes. The sliders are then diced up into individual slider assemblies.

The gap width, $L_G$, is defined to be the distance between the magnetic pole pieces which form the gap of a thin film head. The gap length of a particular head is generally related to the track width of the magnetic media on which the head records and plays back. In other words, the narrower the gap length of the head, the narrower the track width of the media becomes.

In recent times, the trend has been toward magnetic media exhibiting smaller and smaller track widths. This trend has been necessary in order to increase the storage density of data on magnetic media. Each magnetic medium of a particular track density has a corresponding magnetic head with a particular gap width. Unfortunately, a thin film head made for one track width tends not be compatible with media of another track width. This limitation has generally meant that a recording/playback device using a particular thin film head can only use media having a track width corresponding to that head.

SUMMARY OF THE INVENTION

One advantage of one embodiment of the thin film head of the present invention is compatibility with magnetic media exhibiting different respective track widths.

Another advantage of the thin film head of the present invention is a narrow gap width which results in correspondingly high density magnetic recording capabilities.

Still another advantage of the thin film head of the present invention is that the disclosed head can be fabricated in large quantities using thin film semiconductor fabrication equipment.

In accordance with one embodiment of the present invention, a thin film magnetic head assembly is provided which includes a substrate and an insulative main body situated on the substrate. The head assembly also includes a plurality of magnetic yokes situated on the substrate and within the main body. The head assembly further includes a plurality of coil structures situated within the main body and magnetically coupled to respective magnetic yokes. The head assembly includes a common pedestal of insulative material situated atop the main body and exhibiting a lateral dimension less than that of the main body, the pedestal protruding upwardly away from the main body and substrate. The magnetic yokes of the head assembly each include a pole piece pair situated atop the common pedestal, each pole piece pair including first and second magnetic pole pieces, each magnetic yoke extending through the common pedestal to integrally couple to its respective pole piece pair. A respective gap region is thus formed between the first and second pole pieces of each pole piece pair. In accordance with the present invention, a plurality of magnetic yokes including pole piece pairs which exhibit different pole piece geometries are provided.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 13A is a cross sectional view of the magnetic head of FIG. 13B showing the further build-up of the magnetic side poles.

FIG. 13B is a close-up plan view of a portion of the head of FIG. 13A showing the side pole and insulative pedestal area.

DETAILED DESCRIPTION OF THE INVENTION

Figure 2A:
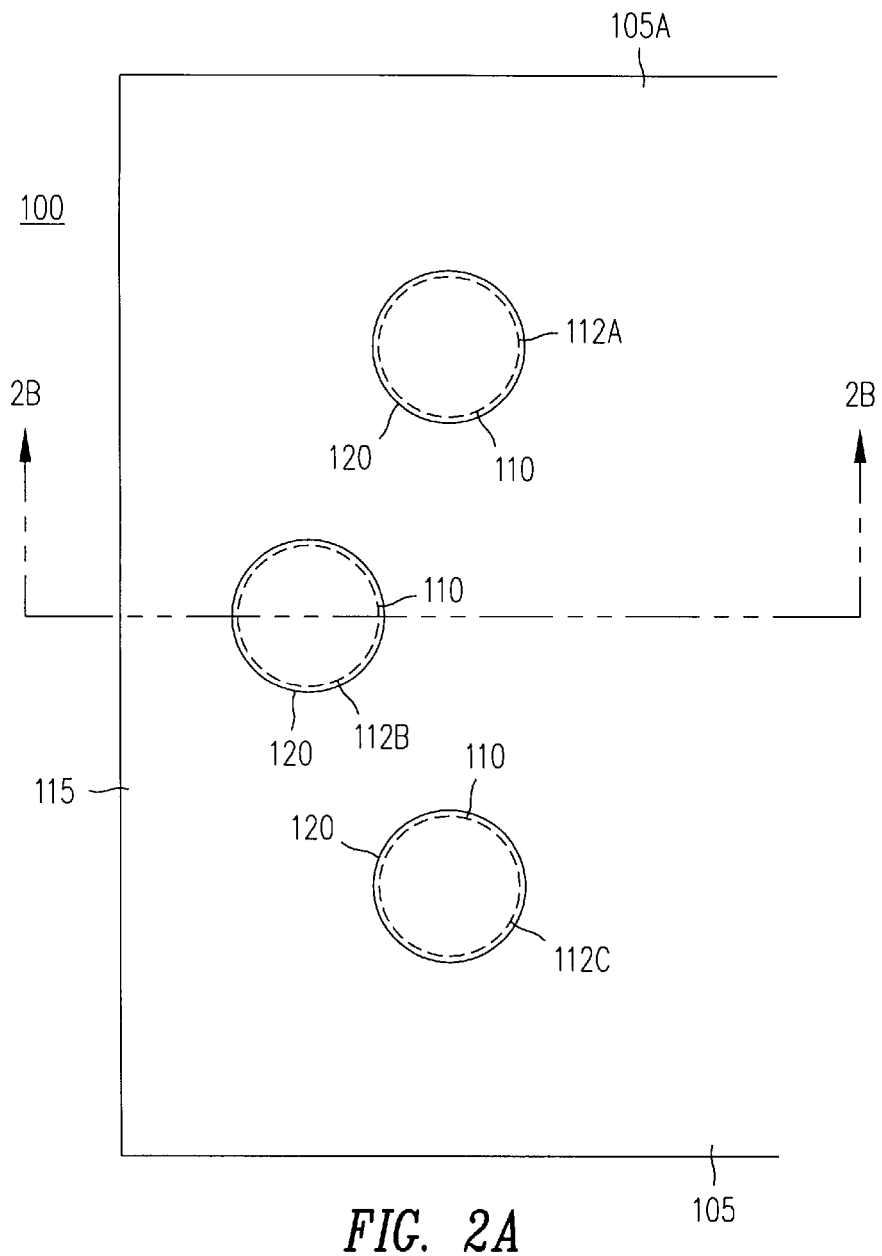
FIG. 2A is a plan view of a substrate with via holes employed by one embodiment of the magnetic head of the invention.

FIG. 2A shows a portion of a thin film head 100 which is situated on an insulative substrate 105 such as a ceramic, alumina or other nonconductive substrate. Substrate 105 includes opposed surfaces 105A and 105B. Via holes 110 are formed in substrate 105 and are filled with an electrically conductive material to create conductive paths through substrate 105 at the locations shown. Laser drilling or other high precision via formation techniques may be employed to form via holes 110. Via holes 110 are filled with electrically conductive material such as plated copper, thick film processed gold, or sintered tungsten and copper, for example, to form via connective members 112A, 112B and 112C. Connective members 112A and 112C will subsequently be coupled to the ends of a coil structure and connective member 112B will be coupled to ground. In one embodiment of the invention wherein the magnetic head is ungrounded, via hole 112B is omitted. In actual practice, substrate 105 is a wafer on which the FIG. 2A pattern is replicated thousands of times.

Figure 2B:
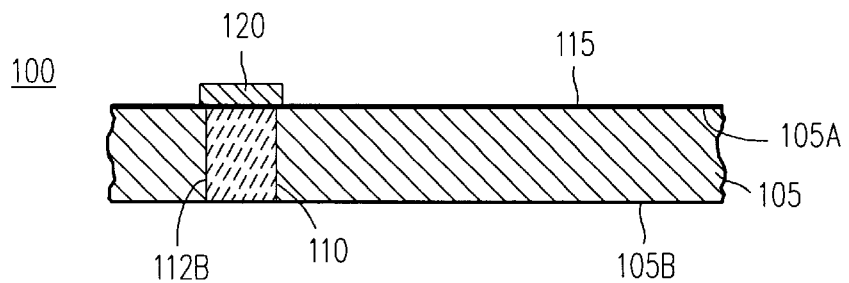
FIG. 2B is a cross section of the magnetic head of FIG. 2A taken along section line 2B—2B.

A seed layer 115 of an electrically conductive material suitable for plating is sputtered on substrate surface 105A. For example, seed layer 115 may be fabricated from Cr—NiV, namely, a chrome or other adhesion-promoting layer followed by a non-magnetic nickel-vanadium 7% film. Via caps 120 are patterned using photolithographic techniques and plated on seed layer 115 at the tops of vias 110 as shown in FIGS. 2A and 2B. More specifically, to pattern via caps 120, a photoresist layer (not shown) is deposited on seed layer 115 and patterned to include openings above connective members 112A, 112B and 112C at which the formation of respective via caps 120 is desired. Plating is then conducted in these openings using seed layer 115 as the seed. The photoresist is then removed, thus leaving patterned via caps 120. As used in this document, the term "patterning" will mean the formation of a particular layer such that the layer exhibits a specified pattern, such as described with respect to the formation of via caps 120 above, for example.

Via caps 120 are fabricated from NiFe by any suitable deposition or plating process. It is noted that later in the process described herein, portions of seed layer 115 will be removed by sputter etching. While in the particular example described, via caps 120 are fabricated from NiFe, in actual practice via caps 120 can be fabricated from other conductive materials which would not be attacked by the particular etchant used to later remove Cr—Cu seed layers 185, 230 and 275. Via caps 120 are regarded as being a part of via connective members 112A, 112B and 112C.

Seed layer 115 is also used to pattern and NiFe plate photolithographic alignment targets (not shown) for registration of subsequent layers. The exposed portions of seed layer 115 are then sputter etched away leaving via caps 120 and the alignment targets intact. It should be appreciated that seed layer 115 served as a sacrificial layer for the purpose of enabling plating of via caps 120.

Figure 1:
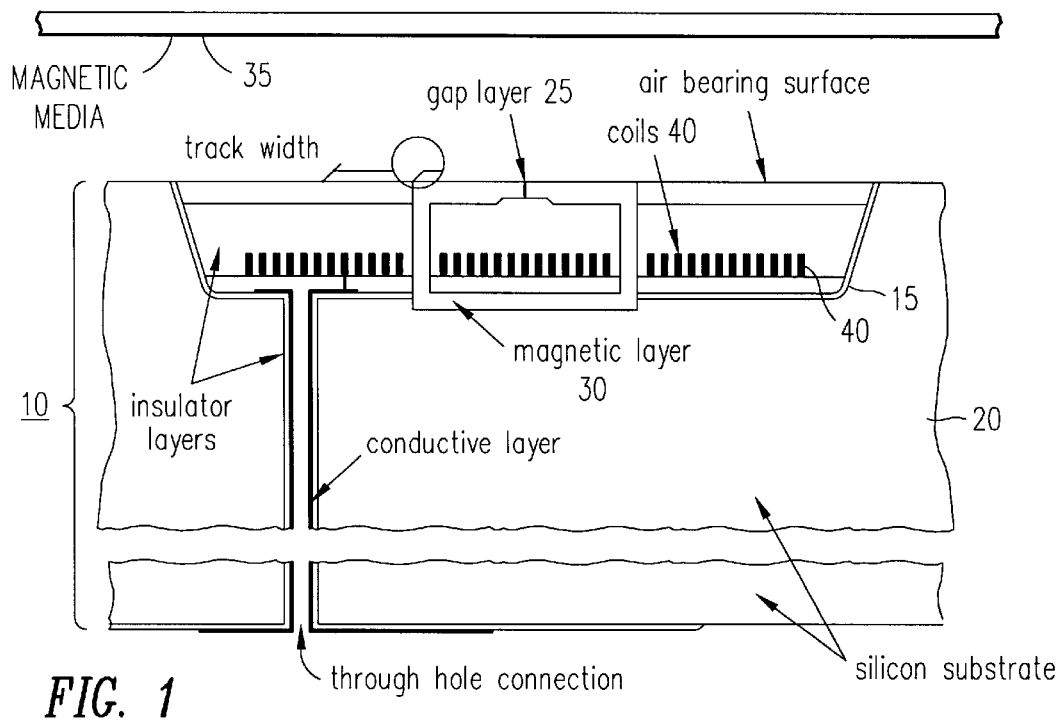
FIG. 1 is a cross section of a conventional thin film magnetic head.
Figure 3:
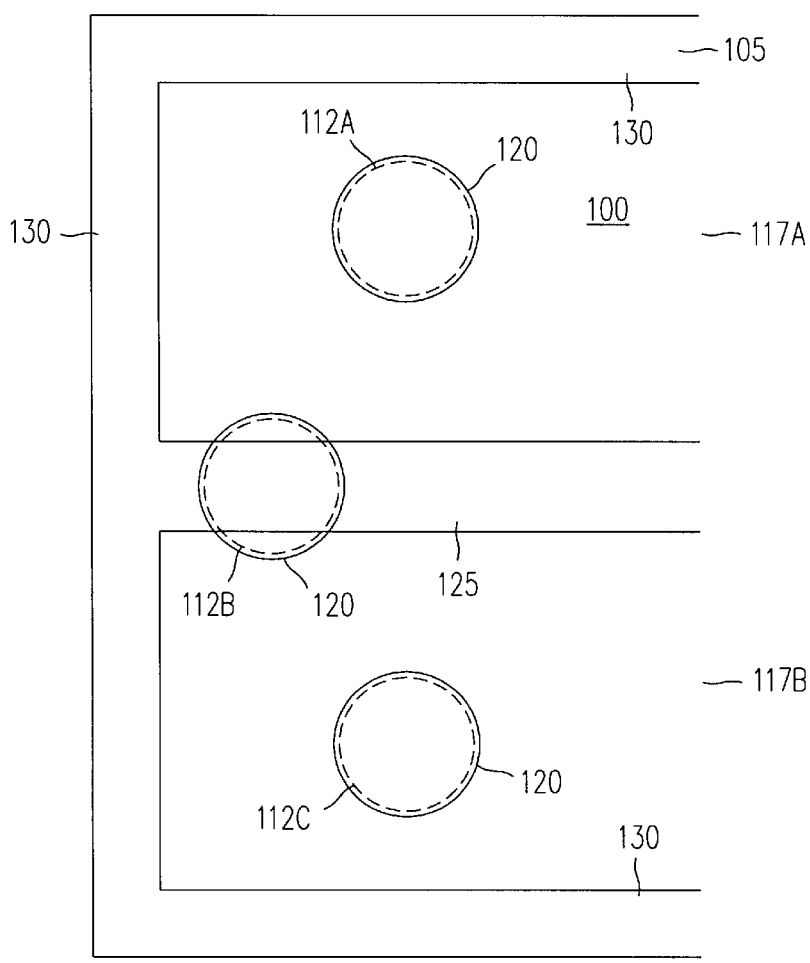
FIG. 3 is a plan view of the magnetic head of FIG. 2A with a seed layer added.

In the next step of the process, a Cr—NiV seed layer 130 is formed on the structure of FIG. 2B after seed layer 115 is etched away. Seed layer 130 is formed in the shape of a ground structure 125 which extends around the periphery of head 100 on substrate 105 and laterally across the middle of head 100 as shown in FIG. 3. Open regions 117A and 117B are thus formed in seed layer 130 which respectively isolate via connective members 112A and 112C from ground structure 125 and via connective member 112B. In the embodiment depicted in FIG. 3, via connective member 112B is coupled to ground structure 125. To actually form seed layer 130, a "lift-off" process is used. In this "lift-off" process, photoresist (not shown) is patterned covering open regions 117A and 117B (see FIG. 3). Seed layer 130 is then sputtered on the entire upper surface of the partially completed head 100. The photo-resist which covers open regions 117A and 117B is now "lifted-off" head 100. To accomplish this lift-off, the partially complete head 100 is placed in an ultrasonic bath including a photoresist solvent such as acetone, for example. The seed layer 130 is sufficiently thin such that it does not cover photoresist layer at open regions 117A and 117B very well. In this manner, there are sufficient avenues of attack by which the solvent can get through seed layer 130 at the edges of open regions 117A and 117B to dissolve the photoresist layer at open regions 117A and 117B. When the photoresist layer at open regions 117A and 117B is thus dissolved, the portions of seed layer 130 immediately above open regions 117A and 117B lift-off and float away. The region of head 100 at open regions 117A and 117B is thus void of seed layer 130 as shown in FIG. 4C.

Figure 4A:
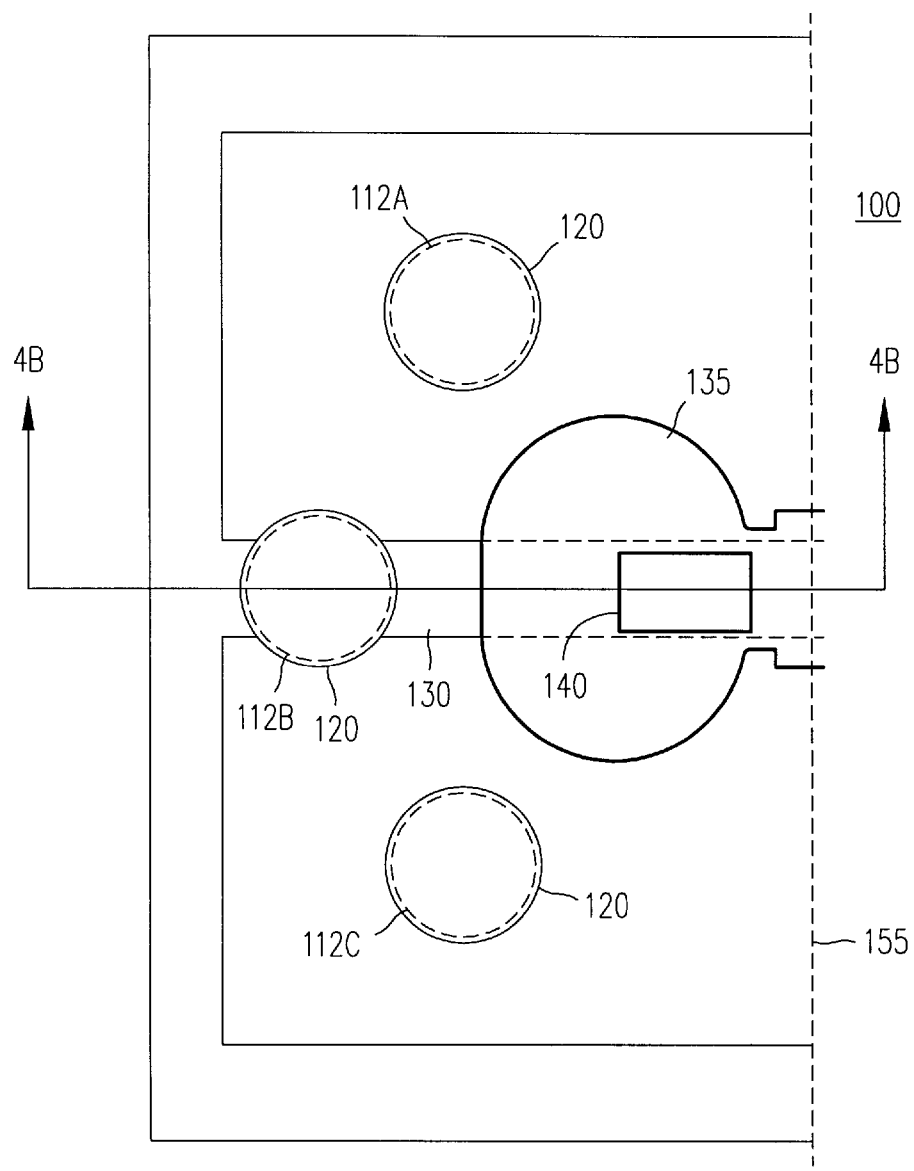
FIG. 4A is a plan view of the magnetic head of FIG. 3 with an insulative layer and open region formed therein.
Figure 4B:
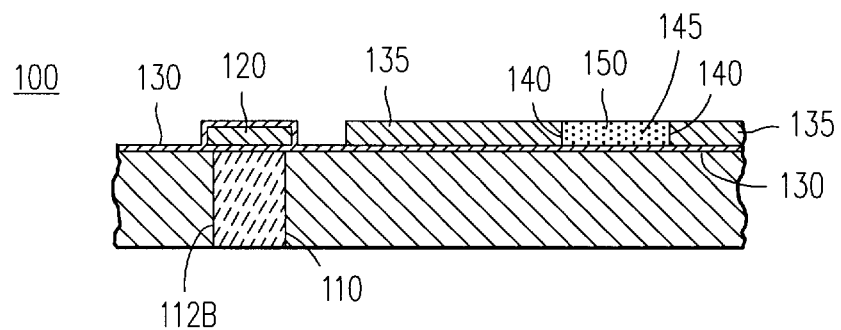
FIG. 4B is a cross sectional view of the magnetic head of FIG. 4A taken along section line 4B—4B.

An insulative layer 135 of photoresist is patterned on head 100 as shown in FIG. 4B. Insulative layer 135 is cured with an electron beam. Exposing the photoresist to an E-beam for a time within the range of approximately 20 minutes to approximately 40 minutes is found to produce acceptable curing results. Insulative layer 135 includes an open region 140 for receiving the lowermost portion of a magnetic yoke 145 therein. More particularly, a layer 150 of magnetic material such as NiFe is patterned and plated on seed layer 130 within open region 140 to form the lowermost portion of magnetic yoke 145. Magnetic layer 150 exhibits a thickness of approximately 5 microns to approximately 6 microns in this particular embodiment. When reference is made to "magnetic layers" or other magnetic structures in this document, it should be understood that layers of magnetically permeable material are being referenced. Magnetic layer 150 forms the bottom pole of magnetic yoke 145. Seed layer 130, or more specifically the middle section of the ground structure 125 thereof, acts as a base upon which magnetic yoke 145 is built up layer by layer. Magnetic layer 150 is plated up to a level such that it is level with insulative layer 135.

Figure 5:
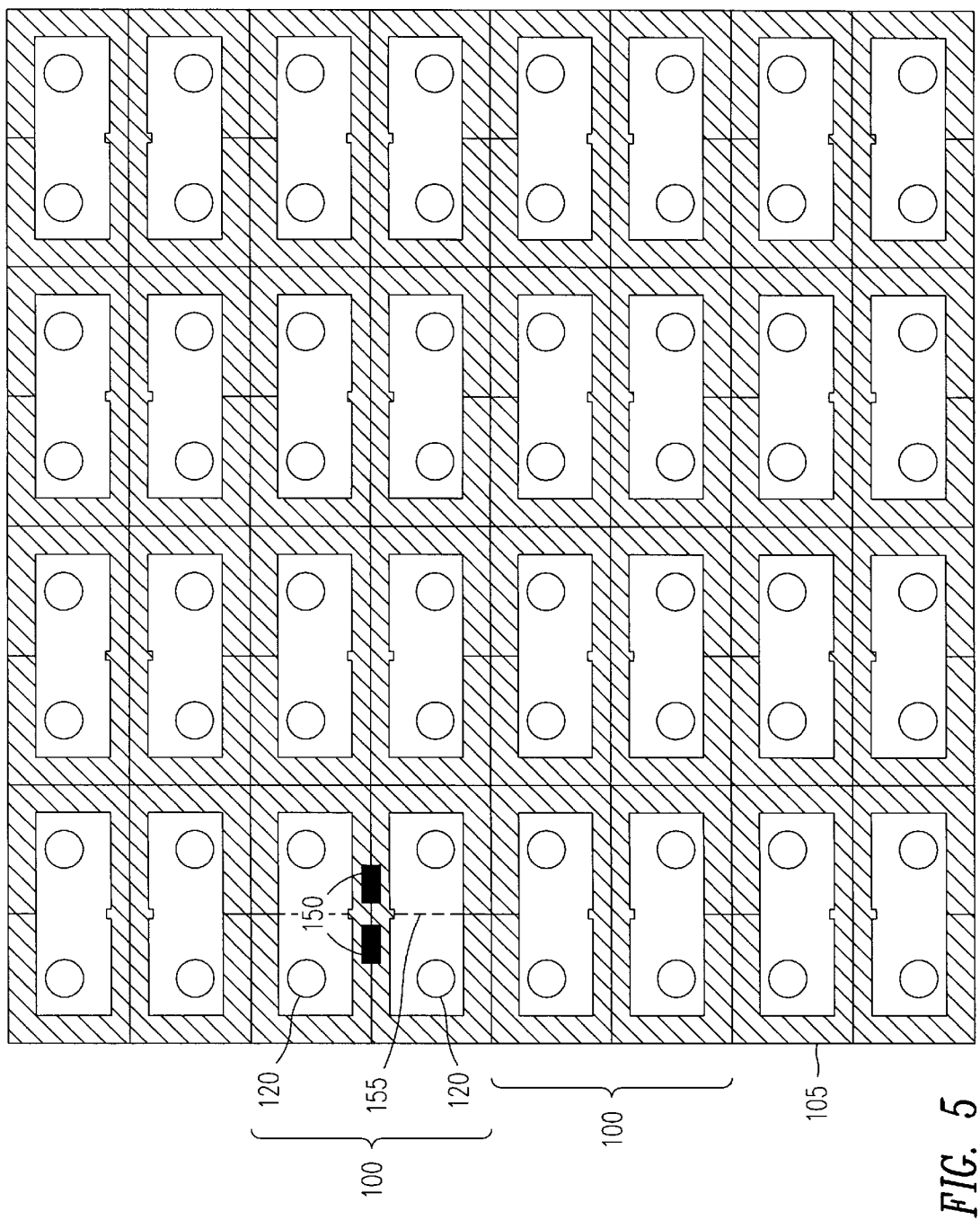
FIG. 5 illustrates a plurality of magnetic heads being fabricated on a common substrate.

For convenience, one half of head 100 is depicted in FIG. 4A and subsequent figures. It should be understood that substantially the same structure as shown in FIG. 4A and the subsequent figures is repeated to form the actual head. More particularly, in the particular embodiment shown, head 100 is symmetric about major axis 155 such that head 100 actually includes two recording or playback portions. In actual practice, a plurality of heads 100 are fabricated simultaneously on a common semiconductor substrate 105 as shown in FIG. 5. For example, 5000 or more heads may be fabricated at the same time on the same substrate. FIG. 5 shows another embodiment of head 100, namely an ungrounded version in which via connective member 112B is omitted.

Figure 6A:
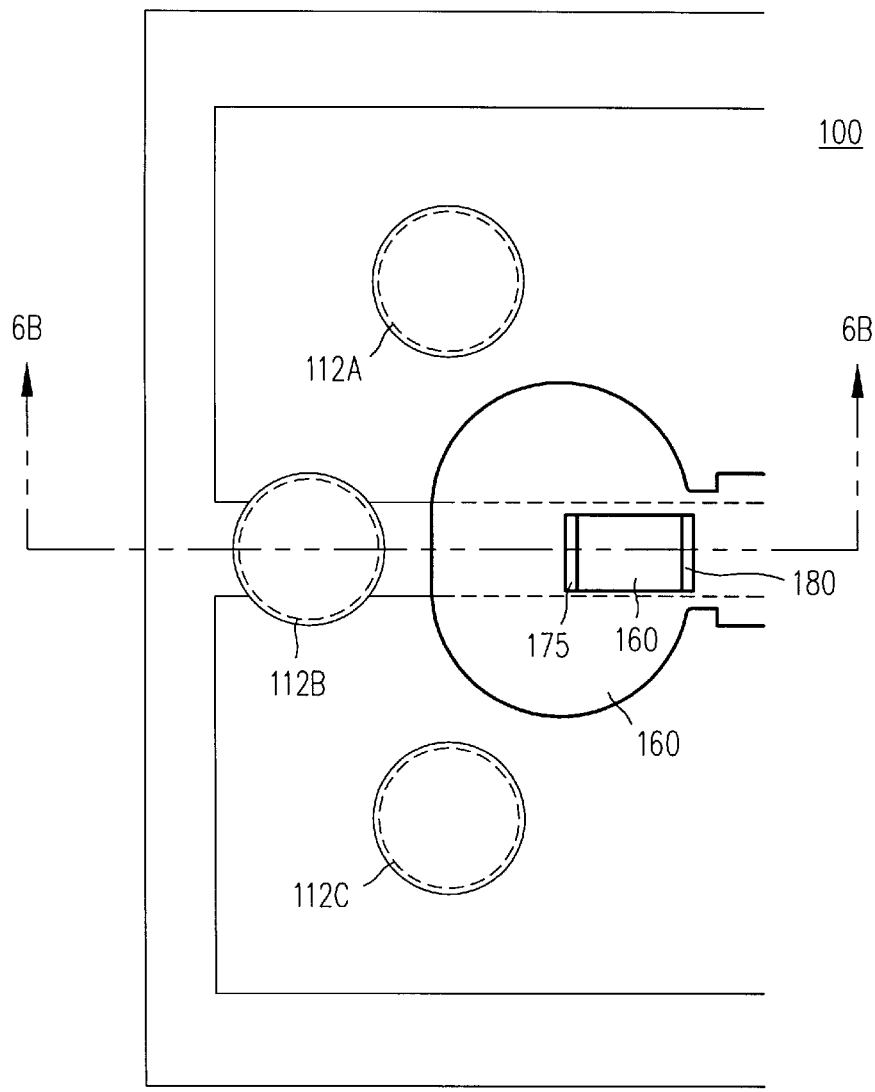
FIG. 6A is a plan view of the magnetic head of FIG. 4A showing an early stage of side pole build-up
Figure 6B:
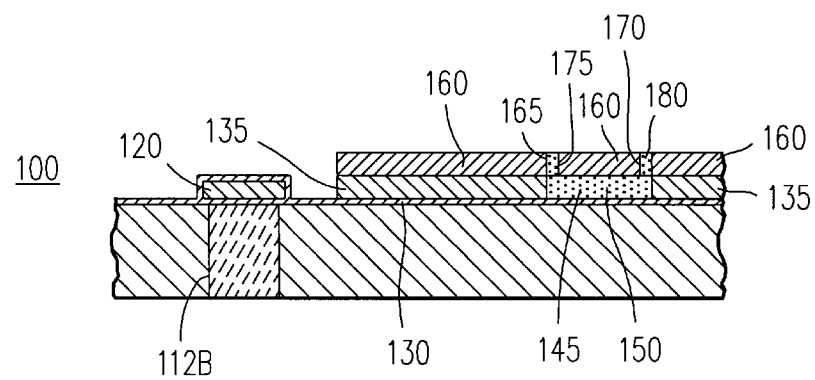
FIG. 6B is a cross sectional view of the magnetic head of FIG. 6A taken along section line 6B—6B.

An insulative layer 160 of photoresist is patterned on head 100 as shown in FIG. 6A and 6B. Insulative layer 160 is electron beam cured to provide a planar surface as illustrated. The thickness of insulative layer 160 in this particular embodiment is approximately 2 microns. Insulative layer 160 includes open regions 165 and 170 in which respective magnetic side poles are built up. More specifically, a magnetic side pole portion 175 is plated in open region 165 up to a height which is level with insulative layer 160, and a magnetic side pole portion 180 is plated in open region 170 up to a height which is level with insulative layer 160.

Figure 7A:
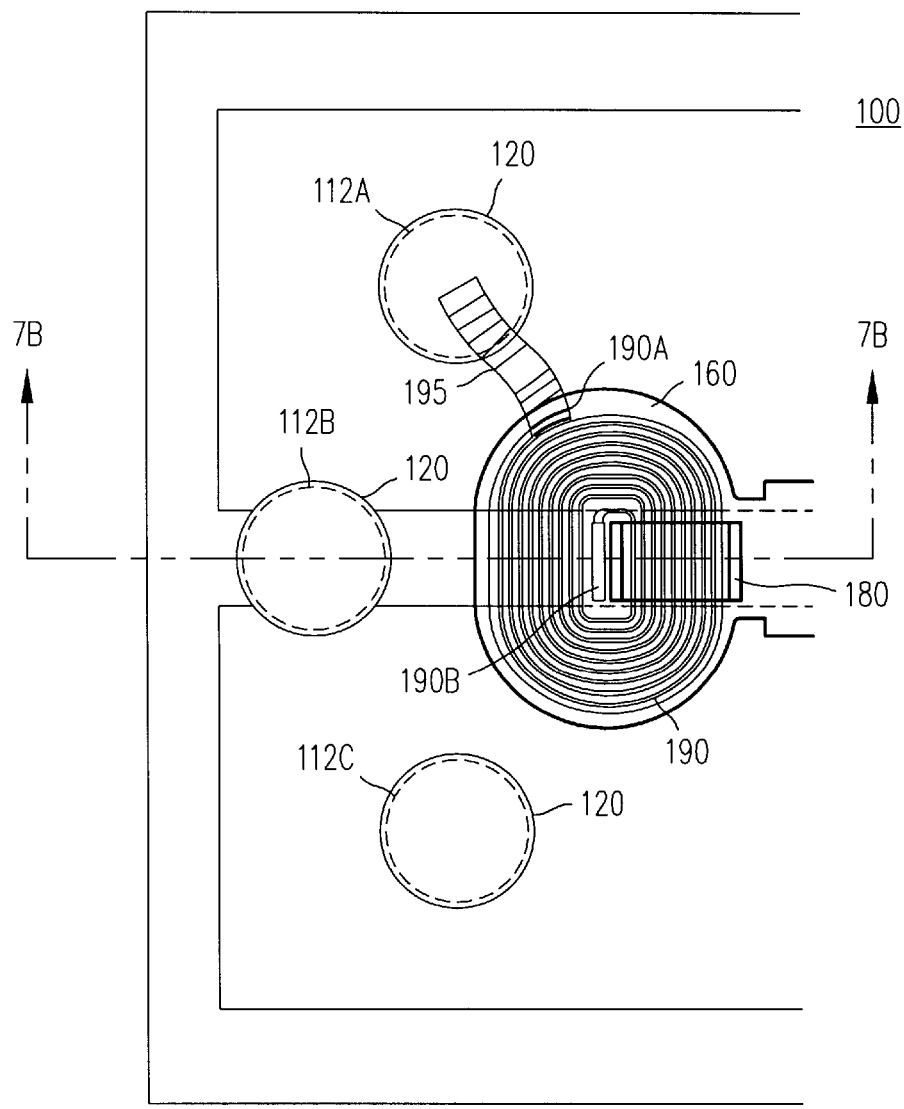
FIG. 7A is a plan view of the magnetic head of FIG. 6A showing the placement of a lower coil structure.
Figure 7B:
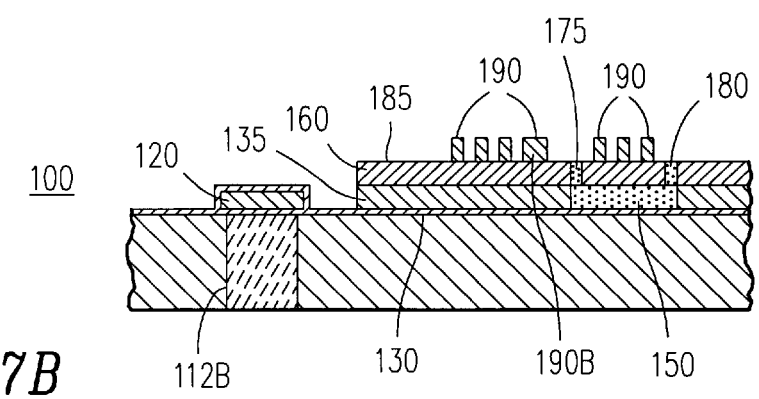
FIG. 7B is a cross sectional view of the magnetic head of FIG. 7A taken along section line 7B—7B.

A seed layer 185 is sputtered on insulative layer 160 of the partially formed head 100 of FIG. 6A to form a plating base for a lower coil layer 190 as shown in FIG. 7A. Seed layer 185 is drawn sufficiently thin such that it does not appear to have significant vertical dimension in FIG. 7A. Seed layer 185 is fabricated from CrCu in one embodiment.

A lower coil layer 190 is formed on seed layer 185 as shown. One way to form lower coil member 190 is to deposit a layer of photoresist (not shown) on seed layer 185. This photoresist layer is then patterned using conventional photolithographic techniques which includes photoresist application, masking, exposure, developing, and so forth. More specifically, the photoresist layer is patterned to cover the entire surface of seed layer 185 except for openings at the locations where the coil elements of lower coil layer 190 are to be formed. Head 100 is then subjected to a plating bath of copper. Copper is thus plated in the openings of the photoresist layer to form lower coil layer 190. The thickness of coil layer 190 is within the range of approximately $3\mu$ to approximately $3.5\mu$ at this stage.

Lower coil layer 190 includes a connective strip 195 made of electrically conductive material which couples an end 190A of coil layer 190 to the via cap 120 of via connective member 112A. Copper plating may be used to fabricate connective strip 195 as part of the above step of forming lower coil layer 190. The remaining end 190B of lower coil layer 190 is located at the center of the lower coil. Head 100 is then etched to remove seed layer 185 from those portions of head 100 not protected by lower coil layer 190.

Figure 8A:
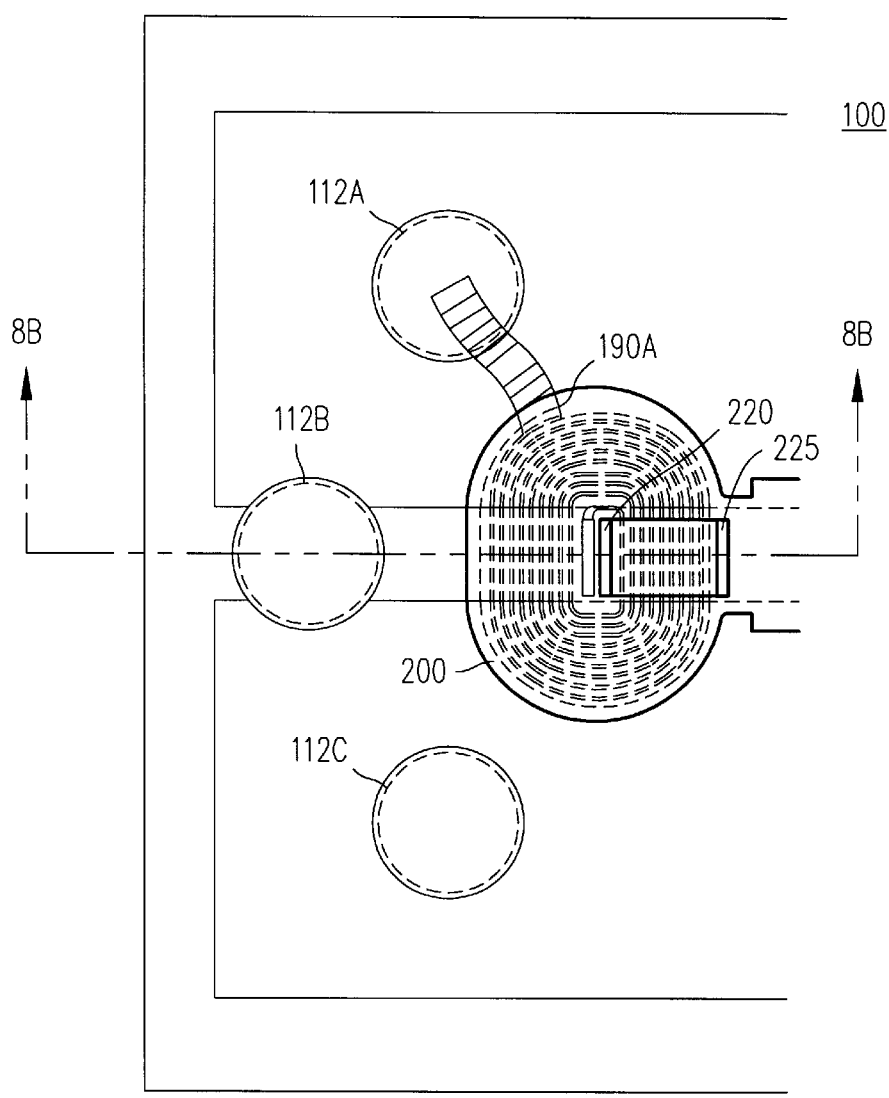
FIG. 8A is a plan view of the magnetic head of FIG. 7A showing an insulative layer on the lower coil structure.
Figure 8B:
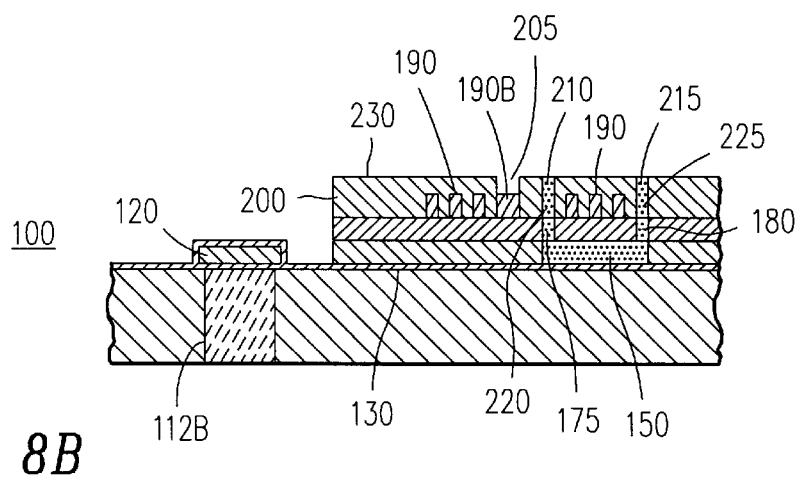
FIG. 8B is a cross sectional view of the magnetic head of FIG. 8A taken along section line 8B—8B.

An insulative layer 200 of photoresist is patterned on head 100 above lower coil layer 190 leaving an open region 205 for access to coil end 190B as shown in FIGS. 8A and 8B. The thickness of insulative layer 200 is within the range of approximately $5\mu$ to approximately $6\mu$ Insulative layer 200 is also patterned to leave open regions 210 and 215 above side pole portion 175 and side pole portion 180, respectively. Insulative layer 200 is electron beam cured. Insulative layer 200 electrically isolates lower coil layer 190 from structures subsequently placed above layer 190.

Magnetic side pole portions 220 and 225 are plated on side pole portions 175 and 180, respectively, as shown in FIGS. 8A and 8B. Side pole portions 220 and 225 are plated with a magnetic material such as NiFe up to a level even with that of insulative layer 200.

Figure 9A:
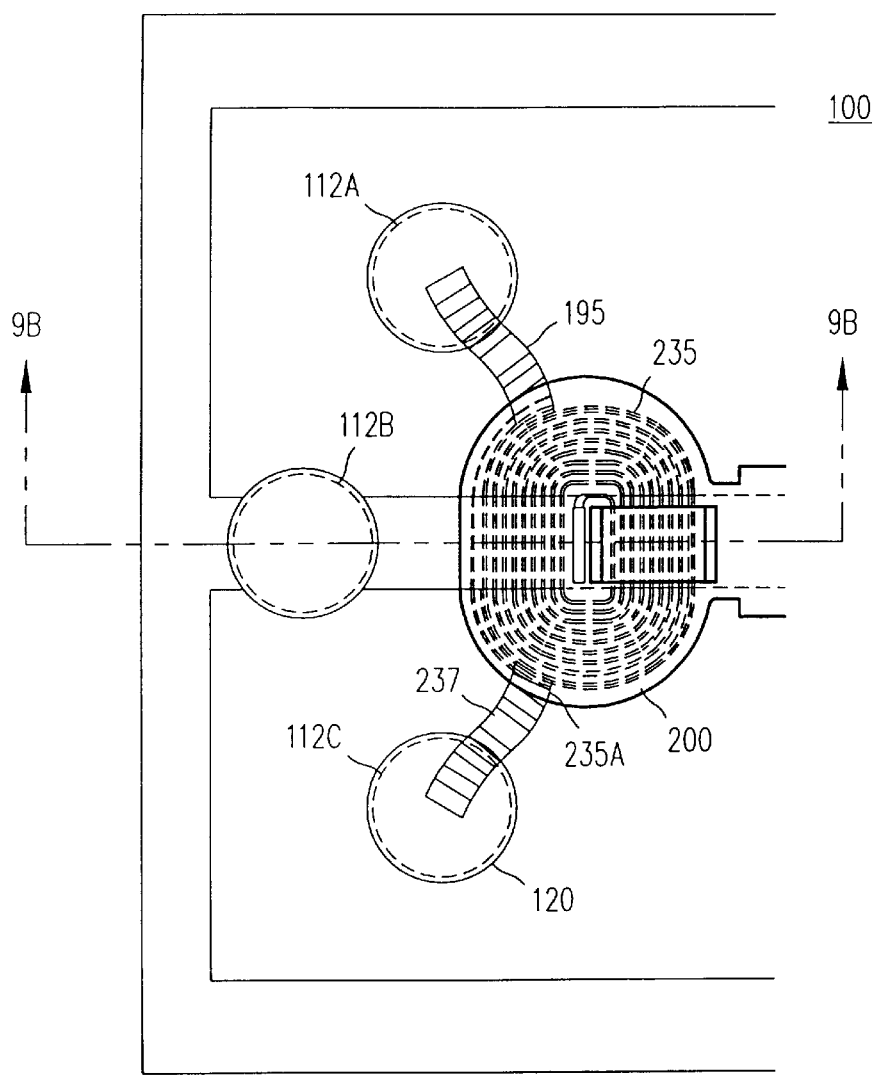
FIG. 9A is a plan view of the magnetic head of FIG. 8A showing placement of an upper coil structure.
Figure 9B:
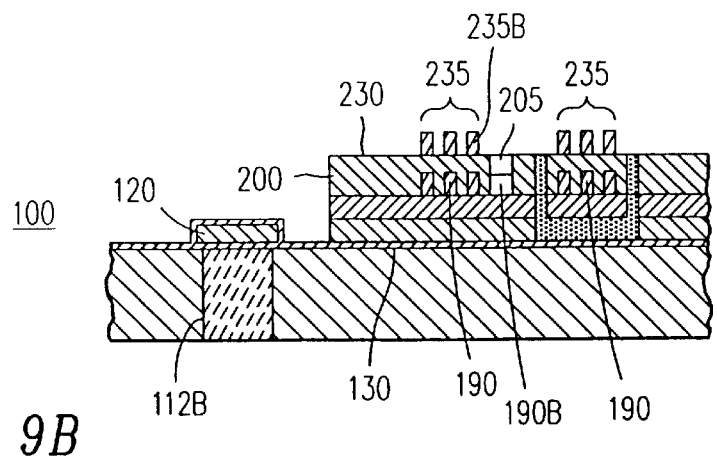
FIG. 9B is a cross sectional view of the magnetic head of FIG. 8A taken along section line 9B—9B.

A seed layer 230 is sputtered on insulative layer 200 of the partially formed head 100 of FIG. 8B to form a plating base for an upper coil layer 235. Seed layer 230 is drawn sufficiently thin such that it does not appear to have significant vertical dimension in FIG. 8B. Seed layer 230 is fabricated from CrCu in one embodiment. Upper coil layer 235 is patterned and copper plated on seed layer 230 as shown in FIG. 9A and 9B. FIG. 9B is a simplified cross-section of head 100 at the described stage of fabrication in which structures in back of upper coil layer 235 are not shown in order to emphasize upper coil layer 235. In this particular embodiment, upper coil layer 235 is substantially similar in geometry to lower coil layer 190 and is fabricated using substantially the same technique. However, other coil arrangements are possible if desired. Head 100 is then etched to remove seed layer 230 from those portions of head 100 not protected by upper coil layer 235.

Upper coil layer 235 includes a connective strip 237 made of electrically conductive material which couples an end 235A of upper coil layer 235 to the via cap 120 of via connective member 112C. Copper may be used to fabricate connective strip 237. The remaining end 235B of upper coil layer 235 is coupled to lower coil end 190B through open region 205, shown later in FIG. 10B, by a plated connection therebetween.

Figure 10A:
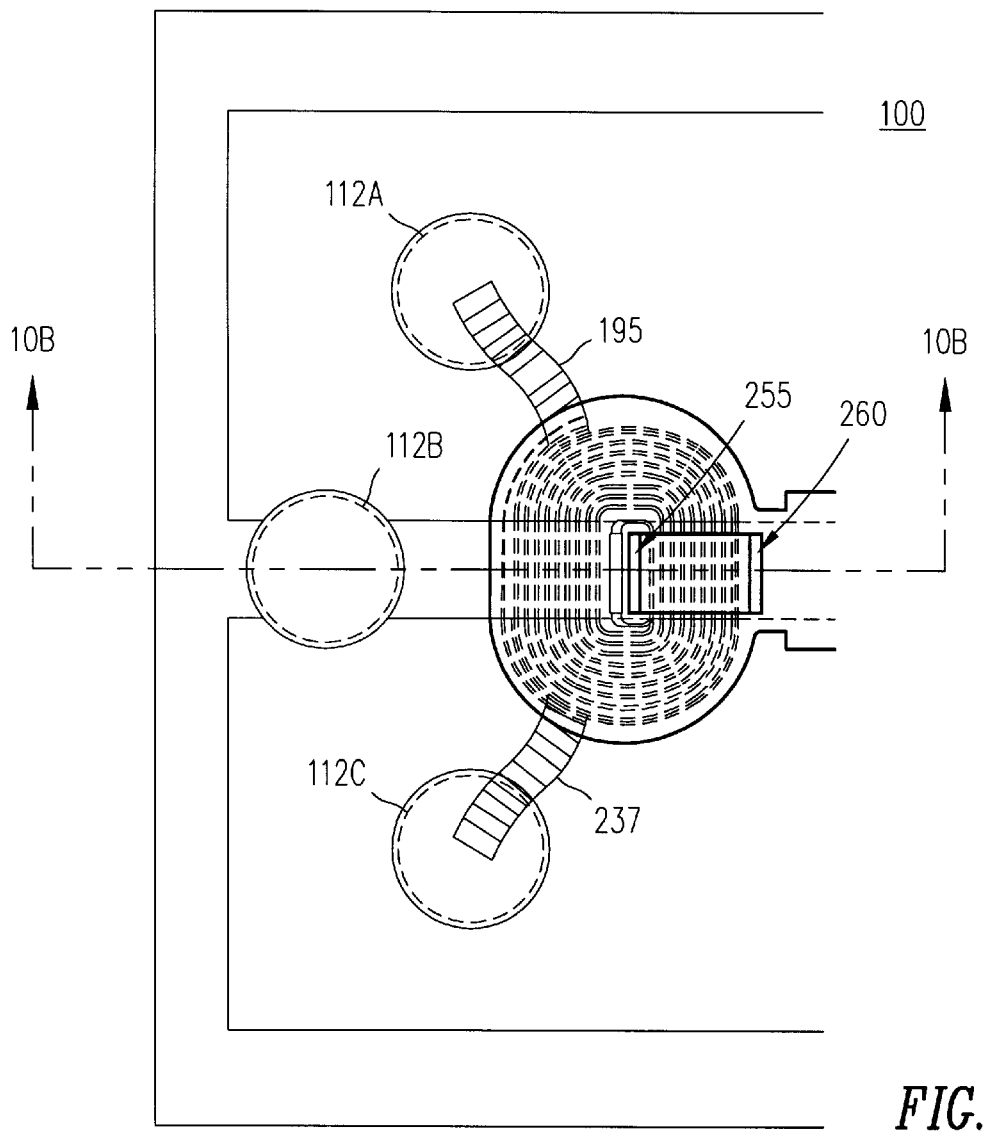
FIG. 10A is a plan view of the magnetic head of FIG. 9A showing an insulative layer on the upper coil structure.
Figure 10B:
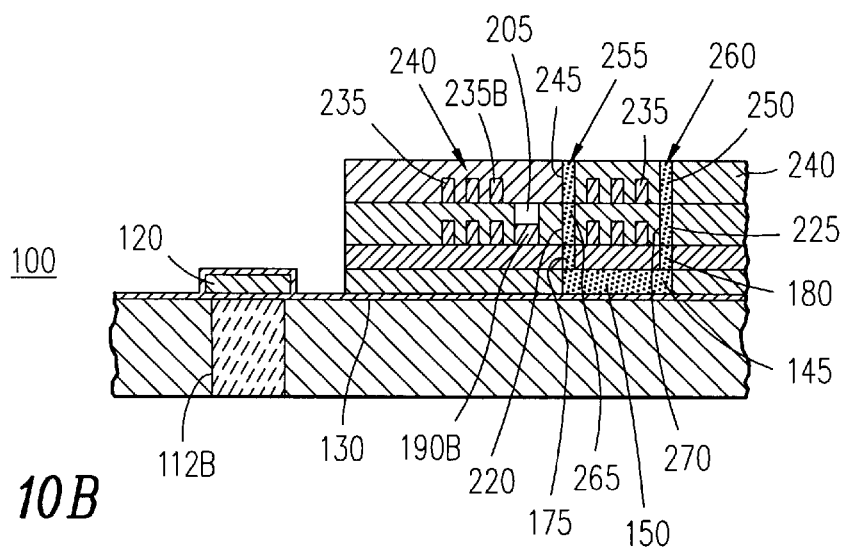
FIG. 10B is a cross sectional view of the magnetic head of FIG. 10A taken along section line 10B—10B.

An insulative layer 240 of photoresist material is deposited and patterned on head 100 as shown in FIGS. 10A and 10B. Insulative layer 240 electrically isolates upper coil layer 235 from the other structures of head 100. Insulative layer 240 includes open regions 245 and 250 into which magnetic side pole portions 255 and 260 are respectively plated. More specifically, magnetic side pole portions 255 and 260 are plated up to a level even with insulative layer 240 as shown in FIG. 10B.

Magnetic side pole portions 175, 220 and 255 together form a first side pole 265. Magnetic side pole portions 180, 225 and 260 together form a second side pole 270. First side pole 265, second side pole 270 and bottom pole 150 together form a significant portion of magnetic yoke 145.

Figure 11A:
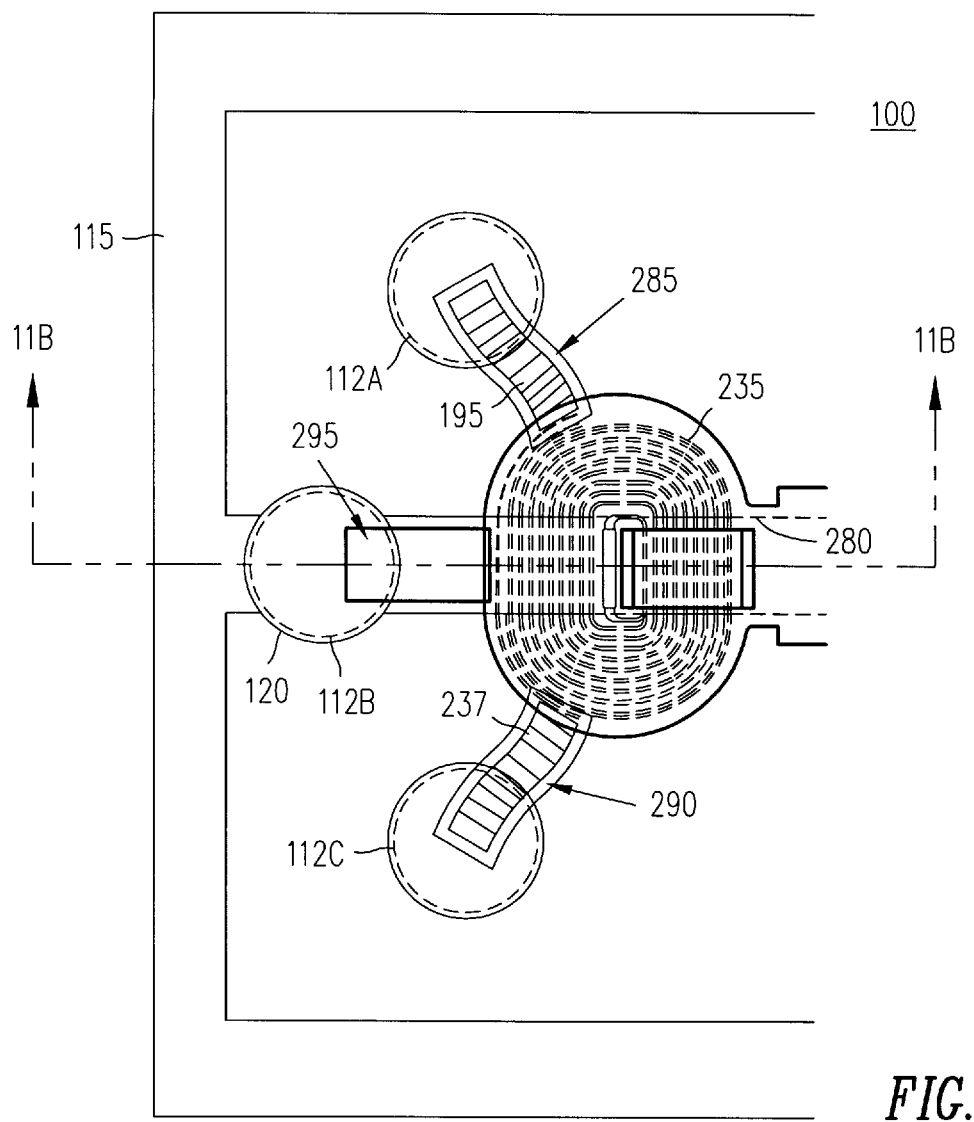
FIG. 11A is a plan view of the magnetic head of FIG. 10A showing placement of a seed layer and a connective grounding strip.
Figure 11B:
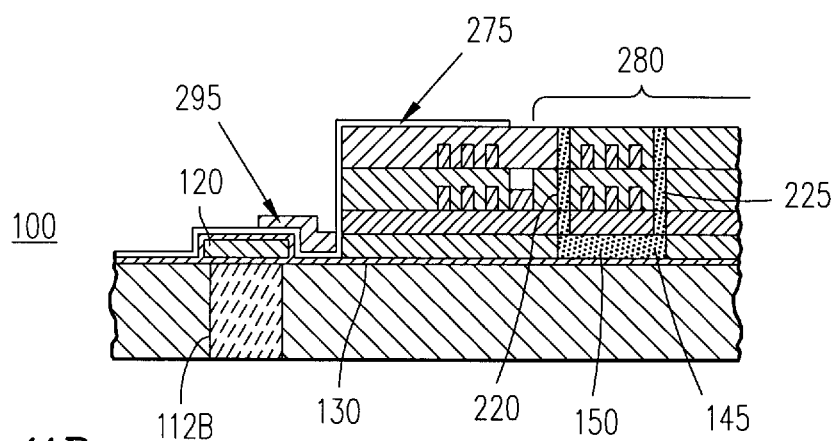
FIG. 11B is a cross sectional view of the magnetic head of FIG. 11A taken along section line 11B—11B.

A seed layer 275 fabricated of CrCu material is formed on the upper surface of the head structure 100 as shown in FIG. 11B. Seed layer 275 is sputtered, patterned and chemically etched on the upper surface of head 100 to include an open region 280 above the side pole structure also as shown in FIG. 11B. Seed layer 275 is formed by an adhesion layer of chromium (Cr) on the upper surface of head 100 followed by a layer of copper (Cu). The chromium adhesion layer enhances the adherence of the copper portion of seed layer 275 to upper surface of head 100.

The primary requirement in selection of the material for seed layer 275 is that seed layer 275 be chemically etchable without damage to the exposed NiFe. Copper is an example of a material that meets this requirement and is also used for the coil seed layers. Chrome is used as the adhesion layer for copper. It is noted that a titanium-tungsten seed layer (Ti 10%; W 90%) which wet etches easily can also be used for seed layer 275.

Protective caps 285 and 290 are patterned over connective strips 195 and 237, respectively. Caps 285 and 290 are fabricated from NiFe by plating in one embodiment. A material such as nickel, nickel-phosphorus 7–10%, or gold may be used to provide environmental protection for the underlying plated copper connective strips.

In an embodiment of head 100 wherein head 100 is grounded, a grounding connective strip 295 is also patterned and plated in the same process step as protective caps 285 and 290. Grounding strip 295 connects ground via connective member 112B and magnetic yoke 145 through seed layer 130. Grounding strip 295 is fabricated from the same material as protective caps 285 and 290 in this particular embodiment.

Figure 12:
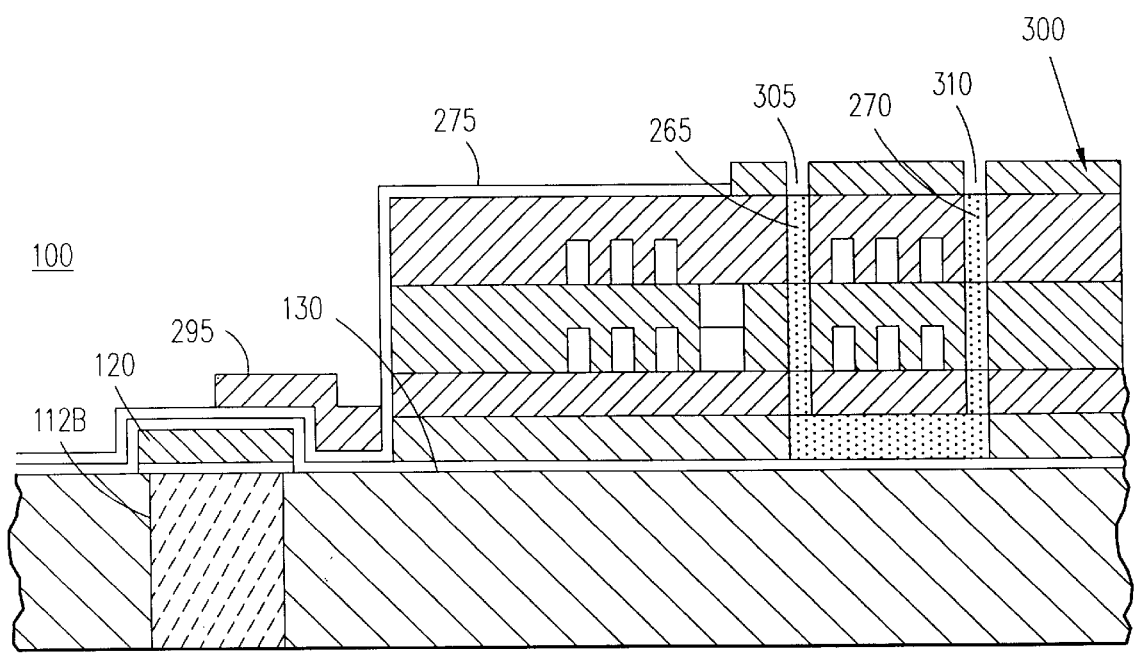
FIG. 12 is a cross sectional view of the magnetic head of FIG. 11B showing placement of an insulative pedestal thereon.

An electrically insulative layer of photoresist is patterned and electron beam cured to form a protrusion or pedestal 300 on the upper portion of head 100 as shown in FIG. 12. Insulative pedestal 300 exhibits a substantially rectangular geometry with rounded corners in this particular embodiment, although other geometries may be used if desired. Insulative pedestal 300 includes open regions 305 and 310 for side poles 265 and 270 of the magnetic yoke. Open regions 305 and 310 are filled with magnetic material by plating side poles 265 and 270 with NiFe up to the level of the top of insulative layer 300 as shown in FIG. 13A. Magnetic side pole portions 315 and 320 are thus formed in open regions 305 and 310. Magnetic side pole portions 315 and 320 form the uppermost parts of first side pole 265 and second side pole 270, respectively.

A frame 325 of magnetic material, for example NiFe, is patterned around insulative pedestal 300 at the same time that magnetic side pole portions 315 and 320 are plated. Plating or other suitable deposition technique is used to form frame 325. Frame 325 exhibits a thickness of approximately 5μ in this particular embodiment. Seed layer 275 acts as the seed for the plating of frame 325. Frame 325 exhibits a substantially rectangular shape in this particular embodiment and surrounds insulative pedestal 300 which forms the inner boundary of frame 325 as seen in FIG. 13B. Shapes other than rectangular can be used for frame 235 as long as frame 325 substantially surrounds, and is located immediately adjacent to, pedestal 300. Frame 325 serves to stiffen insulative pedestal 300 and may provide electrical shielding of the contained structures. FIG. 13B is a close-up view of the coil and side pole regions of head 100 at the present stage in the fabrication of head 100. Alternatively, side pole portions 315 and 320 are fabricated as before, but frame 325 is subsequently patterned and plated with non-magnetic NiP alloy up to a level even with the top of insulative pedestal 300. The innermost boundary of seed layer 275 which abuts its open region 280 is shown in dashed line in FIG. 13B. The exposed CrCu seed layer 275 is removed by wet chemical etching.

Figure 14B:
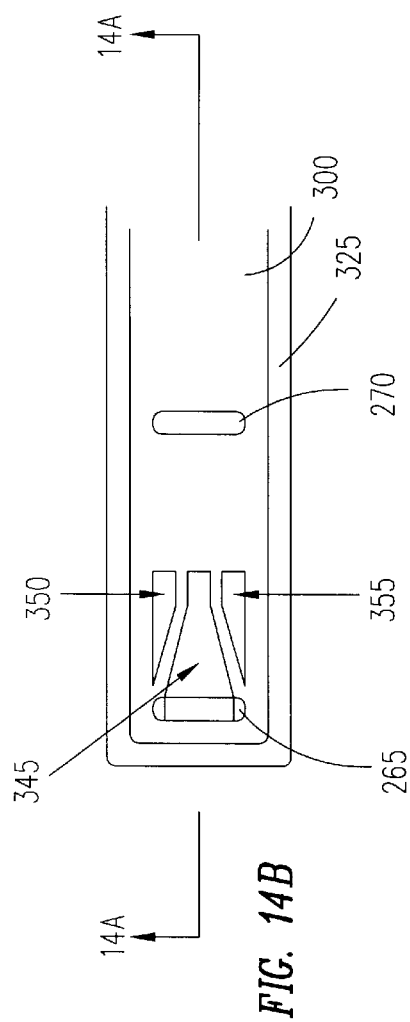
FIG. 14B is a close-up plan view of a portion of the head of FIG. 14A showing the first magnetic pole.
Figure 14A:
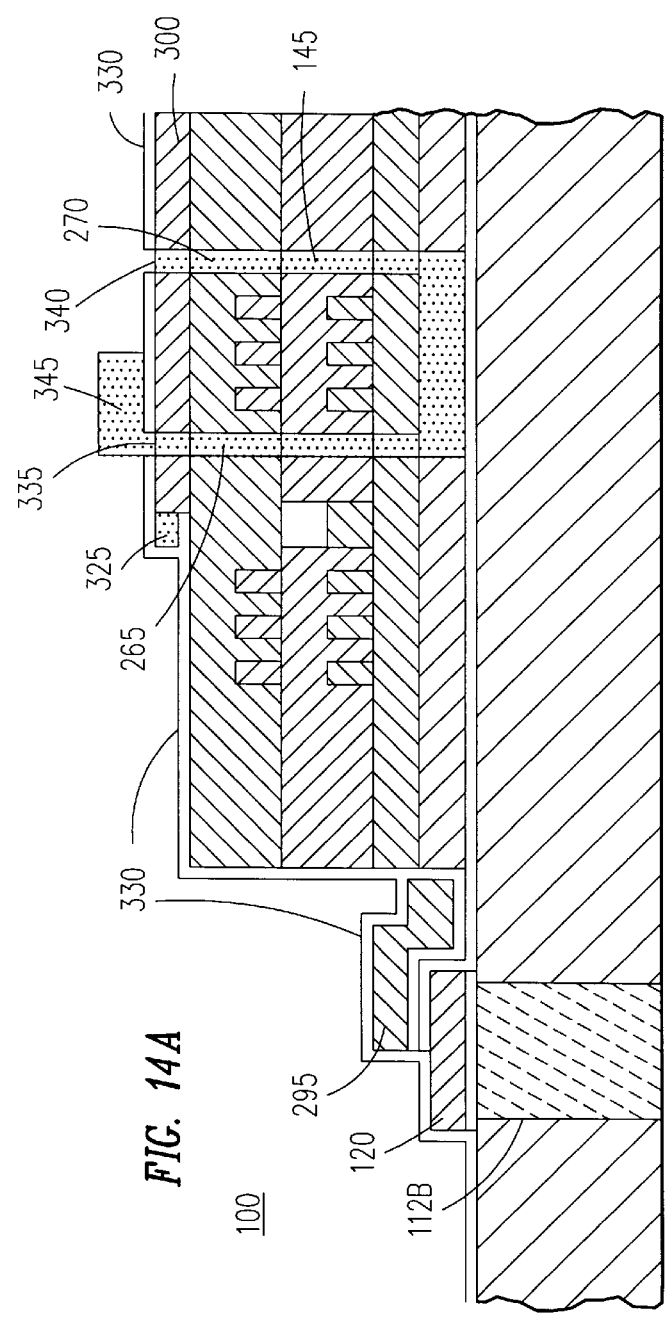
FIG. 14A is a cross sectional view of the magnetic head of FIG. 14B showing the addition of a first magnetic pole at the top of the magnetic yoke structure of the head.

Referring now to FIGS. 3, 14A and 14B, a layer of photoresist is patterned covering open regions 117A and 117B (see FIG.3) and further covering side poles 265 and 270 (see FIG.14A and 14B). A Cr—NiV seed layer 330 is sputtered on the exposed upper surfaces of head 100. The photo-resist is stripped as in the earlier-described "lift-off" process, thus "lifting off" the sputtered Cr—NiV film from regions 117A and 117B. During this photoresist stripping step, the photoresist above side poles 265 and 270 is removed to form open regions 335 and 340 as shown in FIG. 14A. Side poles 265 and 270 are thus exposed.

A first magnetic pole 345 is patterned at the top of magnetic yoke 145 as shown in FIG. 14A and 14B. First magnetic pole 345 is fabricated by plating a magnetic material such as NiFe on side pole 265 and on a portion of seed layer 330 adjacent side pole 265. Magnetic control regions 350 and 355, which are adjacent both sides of first magnetic pole 345, may be patterned and plated at the same time as first pole 345. Magnetic control regions 350 and 355 serve to better control local plating current density which influences NiFe composition and enhances the effect of the easy axis magnetic orienting field of between approximately 1000 Gauss to approximately 10,000 Gauss, provided by an external magnet during the first magnetic pole plating step, to give a desired magnetic domain structure in the magnetic pole piece. Head 100 is exposed to the same magnetic field throughout the duration of building up the various magnetic layers thereof.

Figure 15A:
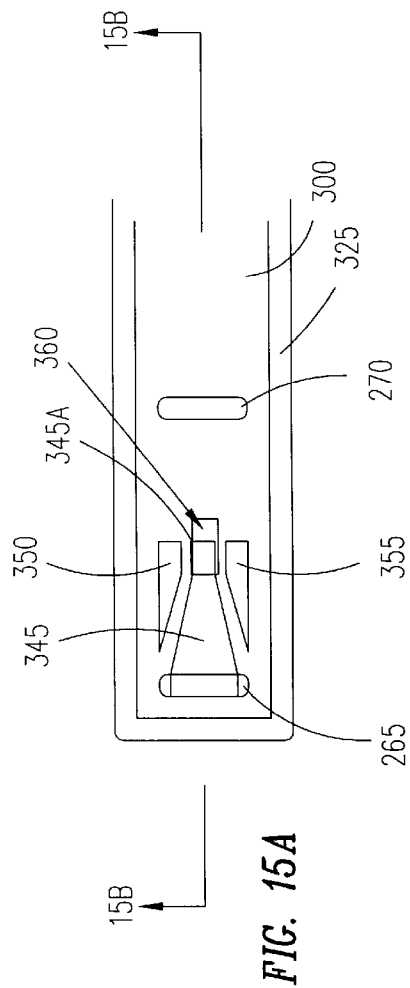
FIG. 15A is a close-up plan view of a portion of the head of FIG. 14A showing the gap region of the head.
Figure 15B:
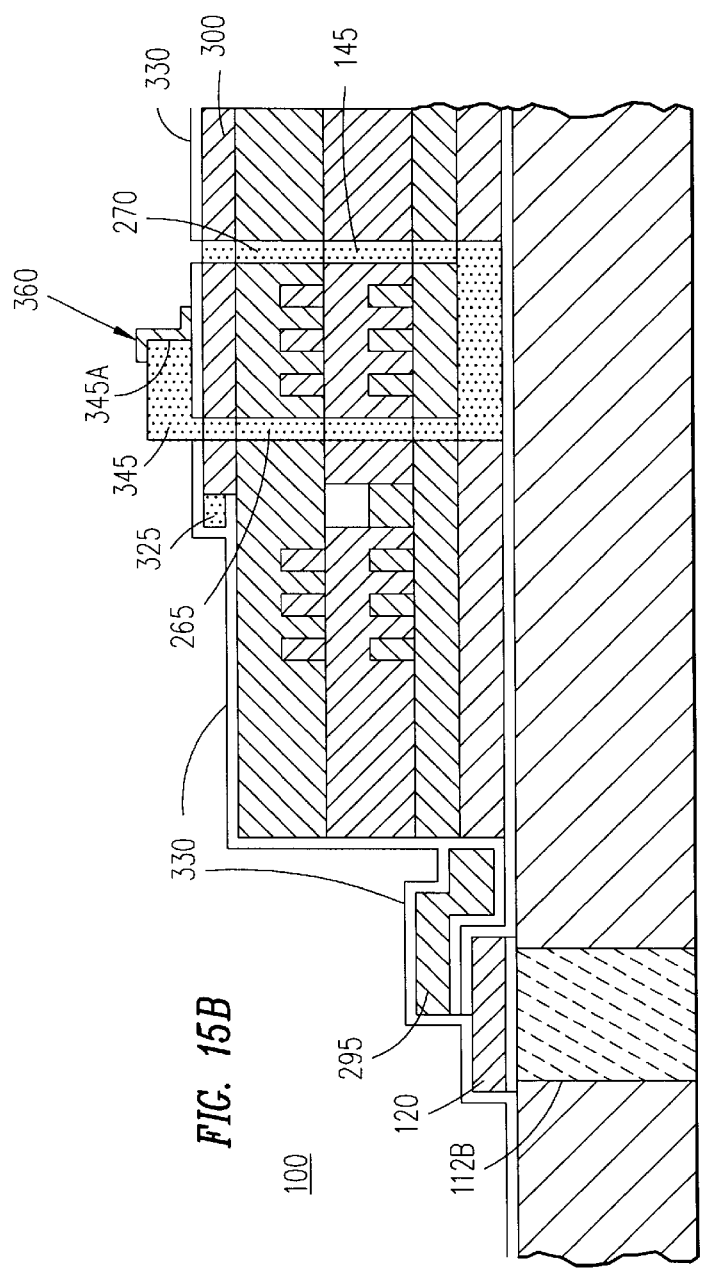
FIG. 15B is a cross sectional view of the magnetic head of FIG. 15A showing the addition of a gap region.

A substantially rectangular gap region 360 of non-magnetic material is plated adjacent pole end 345A as shown in FIG. 15A and the head cross section of FIG. 15B. One non-magnetic material which may be used to fabricate gap region 360 is NiP. Diamond-like carbon is another material which may be chemically vapor deposited as gap region 360.

Figure 16A:
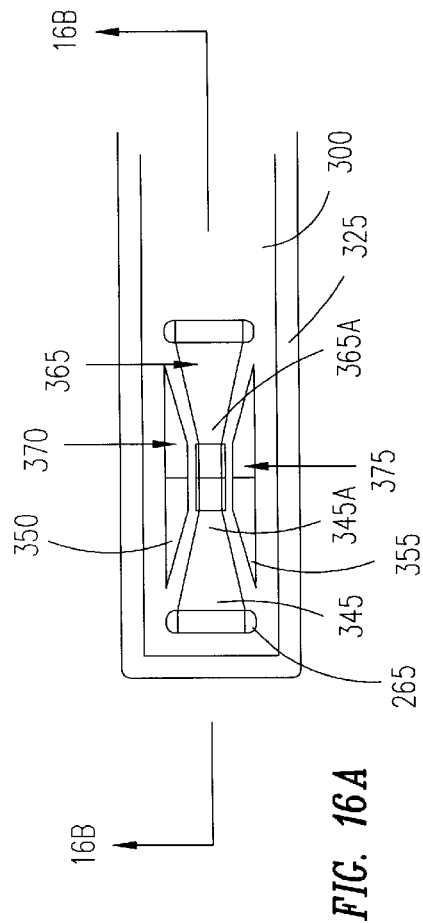
FIG. 16A is a close-up plan view of the side pole and gap region of the magnetic head of FIG. 15A showing the addition of a second magnetic pole at the top of the magnetic yoke structure of the head.
Figure 16B:
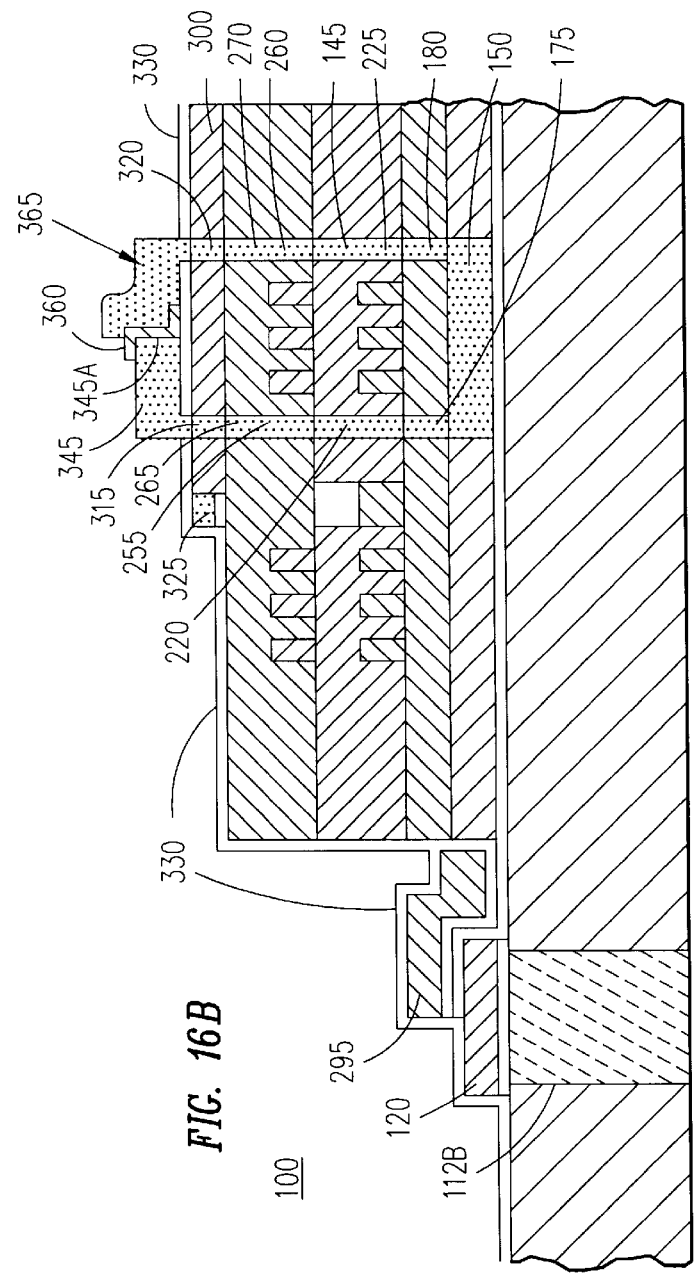
FIG. 16B is a cross sectional view of the magnetic head of FIG. 16A taken along section line 16B—16B and showing the addition of a second magnetic pole.

A second magnetic pole 365 is patterned and plated at side pole 270 at the top of magnetic yoke 145 as shown in FIGS. 16A and 16B. Second magnetic pole 365 includes a pole end 365A which is situated adjacent pole end 345A and which is separated from pole end 345A by gap region 360. It is noted that pole 345 becomes narrower from side pole 265 to pole end 345A. Similarly, pole 365 becomes narrower from side pole 270 to pole end 365A. This gives poles 345 and 365 a bow tie-like appearance in this particular embodiment. Other pole geometries may be used as well. Pole ends 345A and 365A are alternatively referred to as gap ends. First magnetic pole 345 and second magnetic pole 365 exhibit a thickness of approximately 5µ.

Magnetic control regions 370 and 375 are patterned and plated adjacent both sides of second pole 365 to enhance magnetic control as shown in FIG. 16A. Control regions 350, 355, 370 and 375 are fabricated from a magnetic material such as the material used to fabricate second magnetic pole 365. For optimal wear performance, the area of NiFe exposed to the recording media should be minimized. Thus, to avoid possible magnetic effects that may degrade recording performance, NiFe plated magnetic control regions 350, 355, 370 and 375 are patterned with photoresist and etched away leaving a pole geometry seen in FIG. 17A.

Magnetic side pole portions 175, 220, 255 and 315 together make up a first side pole which is shown collectively as side pole 265 in FIG. 16B. Magnetic side pole portions 180, 225, 260 and 320 together make up a second magnetic side pole which is shown collectively as side pole 270 in FIG. 16B. Magnetic yoke 145 is collectively made up of bottom magnetic layer 150, side poles 265 and 270, and magnetic poles 345 and 365.

Figure 17A:
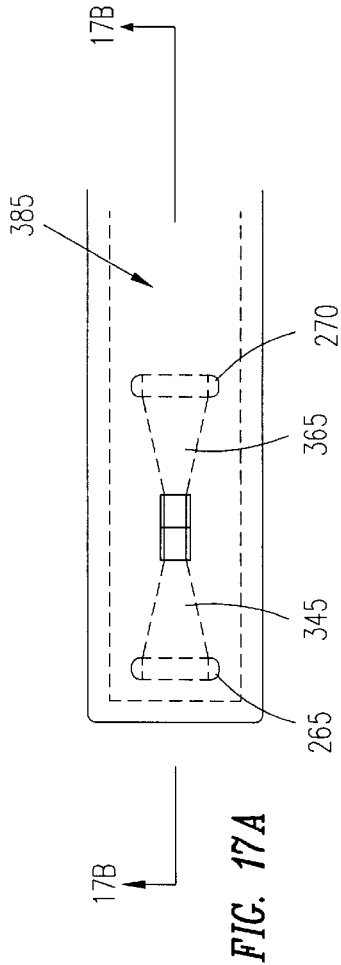
FIG. 17A is a close-up plan view of the side pole and gap region of the magnetic head of FIG. 16A after addition of an adhesion layer and a diamond-like carbon wear layer to the top of the head.
Figure 17B:
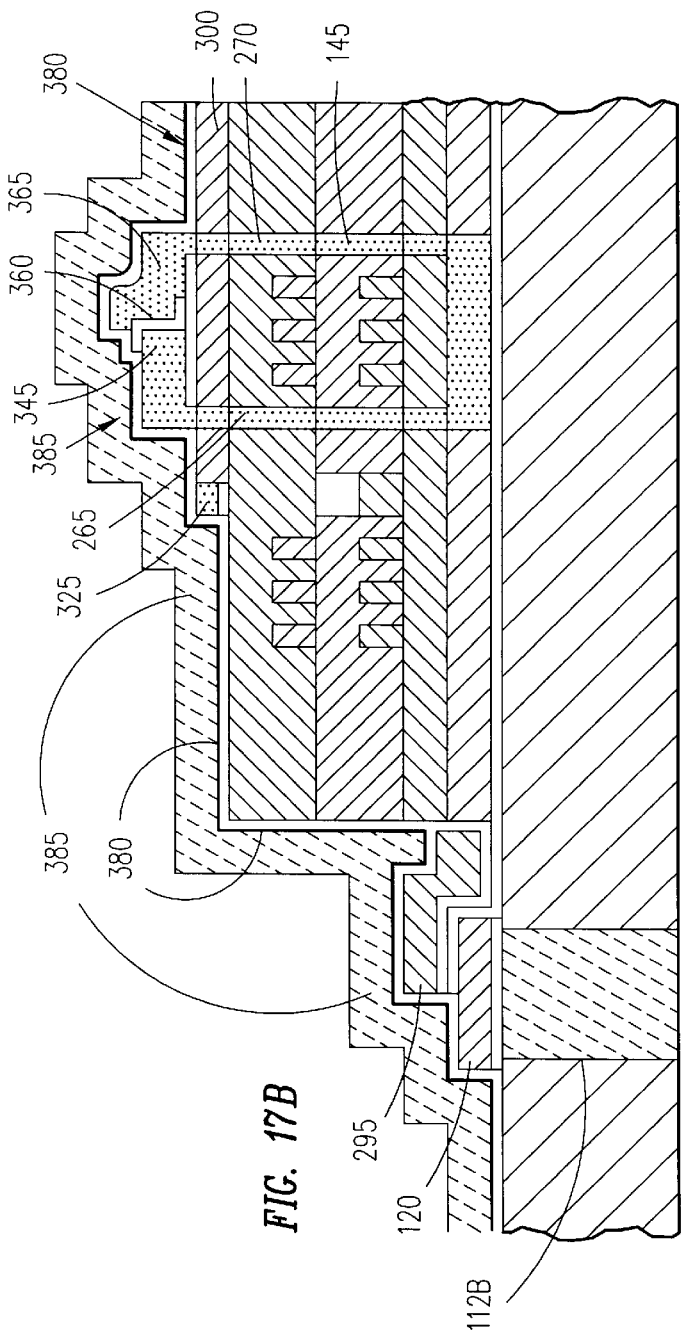
FIG. 17B is a cross sectional view of the magnetic head of FIG. 17A taken along section line 17B—17B.

The exposed seed layer 330 is removed by sputter etching. Alternatively, seed layer 330 is not etched, but is permitted to remain. A silicon adhesion layer 380 is sputtered on the exposed upper surface of head 100 as shown in FIG. 17B. A diamond-like carbon (DLC) protective wear layer 385 is then deposited on adhesion layer 380. Adhesion layer 380 enables DLC layer 385 to stick to the upper surface of head 100. This silicon adhesion layer typically exhibits a thickness within the range of approximately 400 Å to approximately 1000 Å. This silicon adhesion layer exhibits a nominal thickness of approximately 600 Å in a preferred embodiment.

DLC layer 385 covers at least the top of magnetic yoke 145 and the immediately surrounding area of the head. As seen in FIG. 17A and more clearly in FIG. 17B, a hard protective wear layer 385 covers magnetic yoke 145 and insulative pedestal 300. Protective layer 385 exhibits a Knoop hardness greater than 700 Knoop and preferably greater than 800 Knoop. The hardness of protective layer should be within the range of greater than approximately 700 Knoop to approximately 2000 Knoop. One material that is satisfactory for formation of protective wear layer 385 is diamond like carbon (DLC).

Figures 18A, 18B:
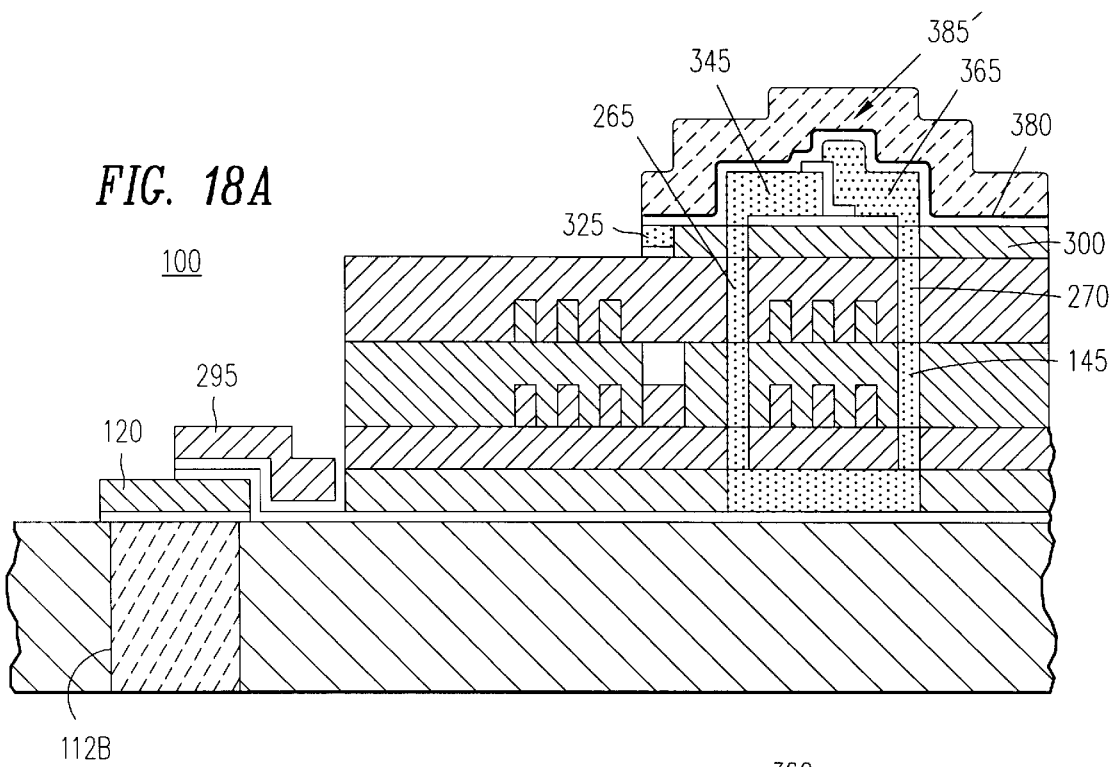
FIG. 18 is a cross sectional view of the magnetic head of FIG. 17B showing the magnetic head after a diamond-like carbon wear layer and adhesion layer are patterned and etched in regions other than the insulative pedestal.

To form such a DLC wear layer 385, DLC layer 385 is chemically vapor deposited and patterned. More specifically, both DLC layer 385 and adhesion layer 380 are reactive ion etched to leave a DLC wear layer 385' over magnetic yoke 145 and insulative pedestal 300 as shown in FIG. 18. Prior to exposing head 100 to this reactive ion etch, the upper surface of head 100 is covered with a layer of photoresist (not shown). The photoresist layer is patterned to include unprotected open regions for those portions of the head external to frame 325. In this manner, when the head is subjected to the reactive ion etch, the portion of DLC layer 385 external to frame 325 is etched away and the remaining portion of DLC layer 385 is protected and remains as DLC layer 385'.

An alternative to the above described photoresist masking approach to patterning DLC layer 385 into DLC layer 385' is to cover head 100 with a metal layer such as chromium. For example, a relatively thin photomask layer (not shown) of chromium is sputtered over the DLC layer. In this particular example, the photomask layer is approximately 500 Å thick. The metal photomask layer is photo-patterned and etched to expose DLC areas which are to be excavated by reactive ion etching. The DLC layer is then reactive ion etched to the desired DLC structure.

More detail is now provided with respect to the formation of DLC protective wear layer 385. Before DLC protective wear layer 385 is actually laid down on silicon adhesion layer 380, adhesion layer 380 is sputter cleaned. In the course of performing this sputter cleaning, approximately 200 Å of the upper surface of silicon adhesion layer 380 is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head 100 is situated on a 6 inch diameter cathode (ie. the energized electrode) of the SAMCO plasma machine, Model PD-200D, for approximately 3 to approximately 4 minutes.

Immediately after the Argon plasma cleaning (sputter etching) is complete, the input power is reduced to 110–150 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 20-approximately 25 mTorr at a flow rate of source material of approximately 25 cm$^3$/min. Although the temperature is not specifically controlled during this process, the wafer on which the head is fabricated is situated on a water-cooled cathode while in the plasma machine. Under these conditions, a DLC deposition rate of approximately 1000 A/min is obtained which is maintained until the desired DLC thickness is reached, namely approximately 5µ.

DLC fabricated in this manner results in a DLC layer 385 with a Knoop hardness of approximately 800. It is found that DLC layer Knoop hardnesses of greater than 700 up to approximately 2000 Knoop produce and acceptably hard wear layer 385 for wear protection purposes. DLC wear layer 385 is then reactive ion etched as described to form DLC wear layer 385'.

Figure 19A:
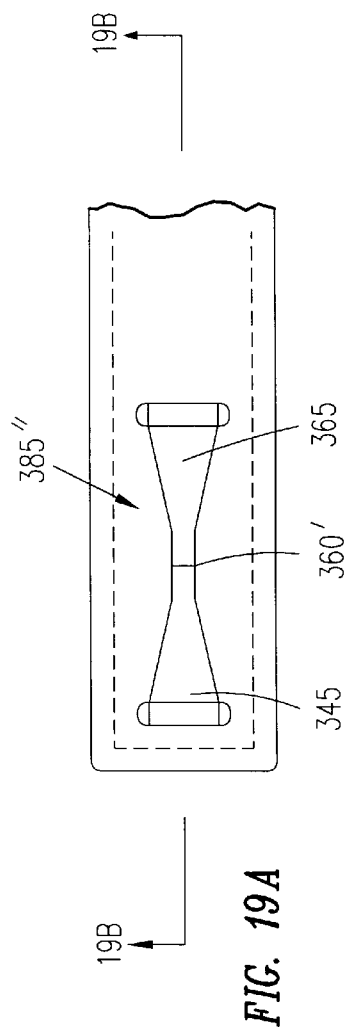
FIG. 19A is a close-up view of the side pole and gap region of the magnetic head when fabrication is complete.
Figure 19B:
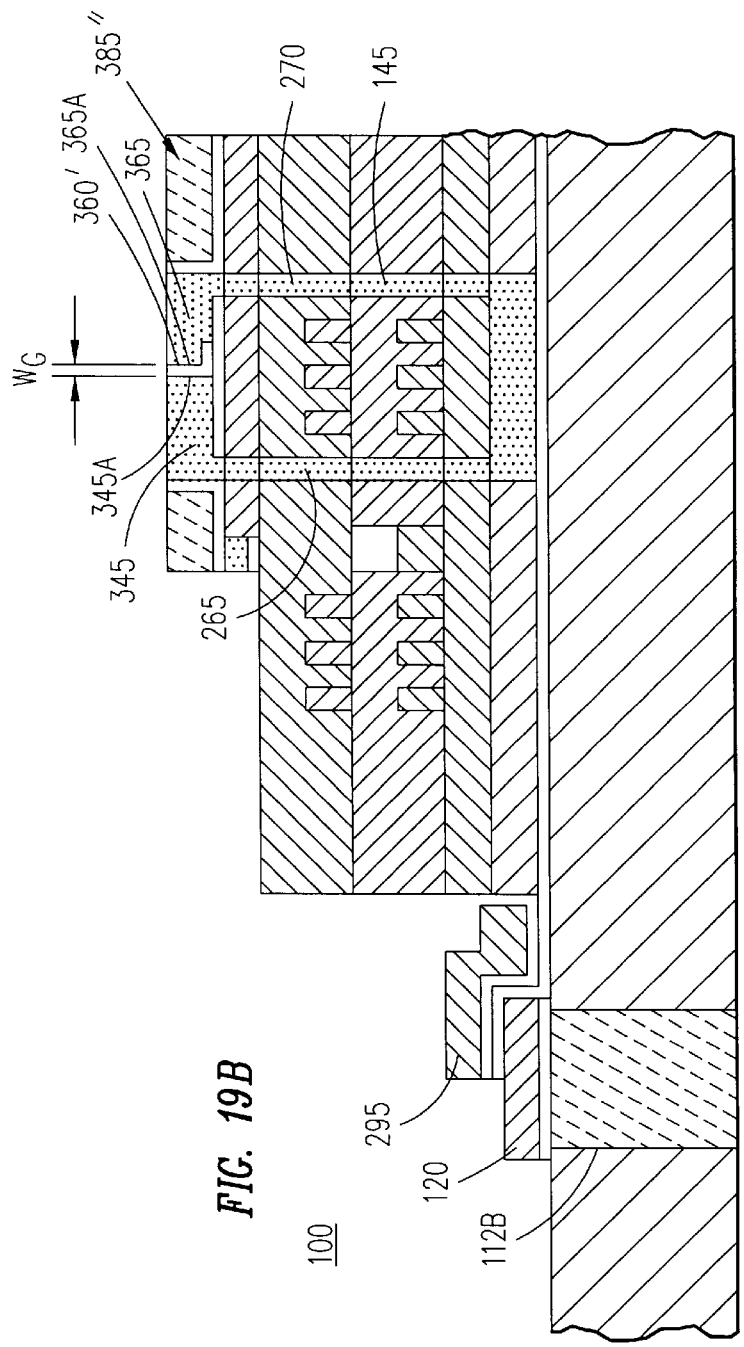
FIG. 19B is a cross section view of the magnetic head of FIG. 19A taken along section line 19B—19B.

DLC wear layer 385' is machined as shown in FIG. 19B to expose magnetic gap region 360 as shown in both FIG. 19A and 19B. DLC wear layer 385' protects head 100, specifically gap region 360 and magnetic poles 345, 365, from wear when head 100 is brought into contact with a magnetic media for recording or playback purposes. By using the techniques described herein, very narrow gap regions can be produced. The gap width, $W_G$, is defined to be the width of gap region 360, namely the distance between pole end 345A and pole end 365A as seen in FIG. 19B. Typical gap widths for head 100 are approximately 0.2 microns to approximately 1 micron.

It is noted that in one embodiment of the invention, the upper magnetic pole elements 345 and 365 are plated directly on magnetic side poles 265 and 270, respectively. Advantageously, no intervening structures are required between upper magnetic pole element 345 and magnetic side pole 265 or between magnetic pole element 365 and magnetic side pole 270. Magnetic pole elements 345 and 365 are thus integral with magnetic side poles 265 and 270, respectively.

Figure 20A:
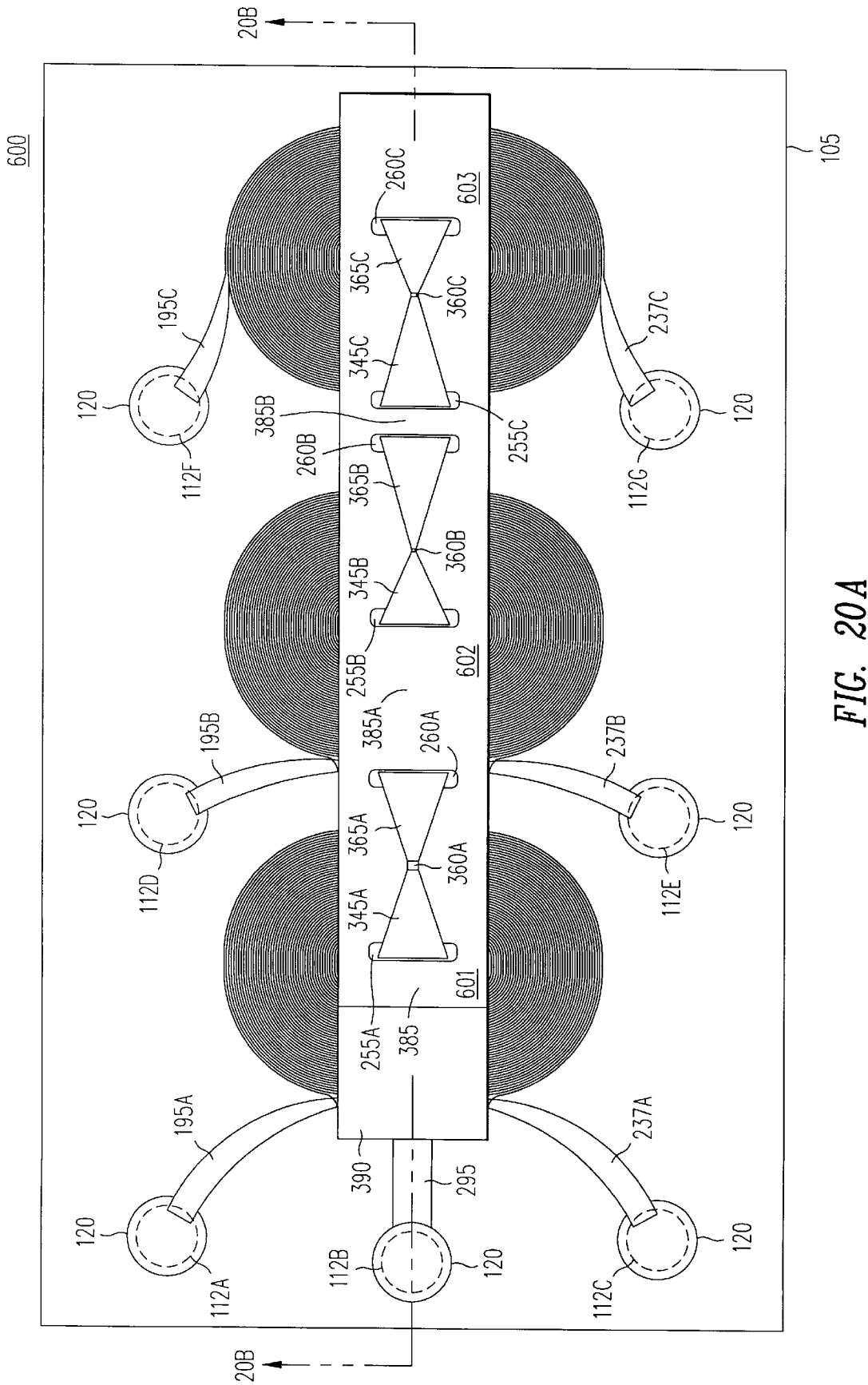
FIG. 20A is a plan view of the upper surface of a thin film magnetic head assembly including a plurality of heads exhibiting different pole piece geometries.

FIG. 20A shows a top plan view of an embodiment of the invention which is compatible with magnetic media exhibiting different track widths. More specifically, FIG. 20A shows a head assembly 600 which includes a plurality of heads exhibiting different pole piece and gap geometries. Head assembly 600 is similar to head 100 described above except for the following differences. Head assembly 600 has the same substrate 105 as head 100 except that the substrate is enlarged to accommodate the particular number of heads to be situated on the substrate. Three different heads 601, 602 and 603 are included in this particular embodiment of the head assembly. Substantially the same fabrication techniques as described earlier in this document can be used to fabricate head assemblies with two, three, four or more heads on a common substrate wherein two or more of the heads on the substrate exhibit different pole piece or gap geometries.

Figure 20B:
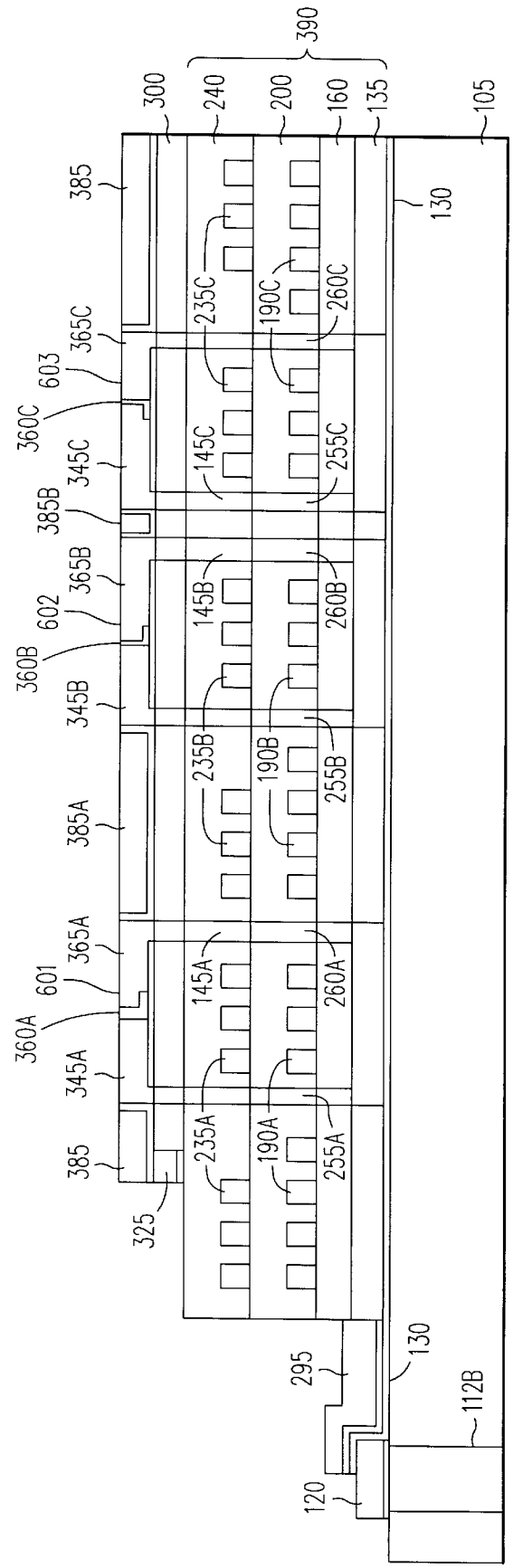
FIG. 20B is a cross section of the head assembly of FIG. 20A taken along section line 20B—20B.

Main body 390 of head assembly 600 is similar to main body 390 of head 100 of FIG. 19 except that the main body of head assembly 600 is laterally extended to accommodate multiple heads as depicted in the cross section of head assembly 600 shown in FIG. 20B. Main body 390 can exhibit different geometries, for example a substantially circular geometry or a substantially rectangular geometry. Whereas head 100 included a single magnetic yoke 145, head assembly 600 of FIGS. 20A and 20B includes magnetic yokes 145A, 145B and 145C. Magnetic yokes 145A, 145B and 145C are built up within insulative layers 135, 160, 200 and 240 in substantially the same manner that magnetic yoke 145 was built up in head 100. Magnetic side poles 255A, 255B, 255C and 260A, 260B, 260C are thus built up layer by layer in the process of forming magnetic yokes 145A, 145B and 145C. Whereas head 100 included a single lower coil layer 190 and a single upper coil layer 235, head assembly 600 includes lower coil layers 190A, 190B, 190C and also includes upper coil layers 235A, 235B, 235C. The heads of head assembly 600 thus share a common main body 390. In the particular embodiment depicted in FIG. 20A, heads 601, 602 and 603 are in horizontal alignment as drawn. However, it should be noted that heads 601, 602 and 603 can also be positioned in a staggered fashion.

Lower coil layer 190A and upper coil layer 235A are connected together at a common end. The remaining two ends of lower coil layer 190A and upper coil layer 235A are coupled to via connective members 112A and 112C by connective strips 195A and 237A, respectively. Lower coil layer 190B and upper coil layer 235B are also connected together at a common end. The remaining two ends of lower coil layer 190B and upper coil layer 235B are coupled to via connective members 112D and 112E by connective strips 195B and 237B, respectively. Lower coil layer 190C and upper coil layer 235C are likewise connected together at a common end. The remaining two ends of lower coil layer 190C and upper coil layer 235C are coupled to via connective members 112F and 112G by connective strips 195C and 237C respectively.

Insulative pedestal 300 of head assembly 600 is formed in substantially the same manner as pedestal 300 of head 100 with frame 325 surrounding pedestal 300 to provide structural integrity thereto. Pedestal 300 is situated atop main body 390 as shown in FIG. 20B. While in this particular embodiment, pedestal 300 is substantially rectangular, it is not so constrained. Rather, pedestal 300 may assume other geometries consistent with the particular application, for example, a substantially circular geometry. Grounding connective strip 295, which is atop seed layer 130, forms a connection between via connective member 112B and magnetic yokes 145A, 145B and 145C. Magnetic yokes 145A, 145B and 145C are grounded in this manner. Connective strip 295 and via connective member 112B can be eliminated if grounding of the magnetic yokes is not desired in a particular application. All of the heads of head assembly 600 share pedestal 300 in common.

Magnetic poles 345A, 345B and 345C of head assembly 600 are fabricated in substantially the same manner as pole 345 of head 100. Gap regions 360A, 360B and 360C are fabricated in substantially the same way as gap region 360 of head 100. And finally, magnetic poles 365A, 365B and 365C are made in substantially the same way as magnetic pole 365 of head 100. The built-up side poles 255A, 255B, 255C and 260A, 260B, 260C to which the described magnetic poles are plated or otherwise formed are visible in FIG. 20A.

At the top surface of the head assembly 600 thus formed, the three heads are surrounded by a durable wear layer 385 fabricated from diamond like carbon (DLC) in a manner similar to DLC layer 385 of head 100. DLC layer 385 is situated atop insulative pedestal 300. DLC wear layer 385 includes portions 385A and 385B which are situated between the heads as shown in FIGS. 20A and 20B.

Figure 21A:
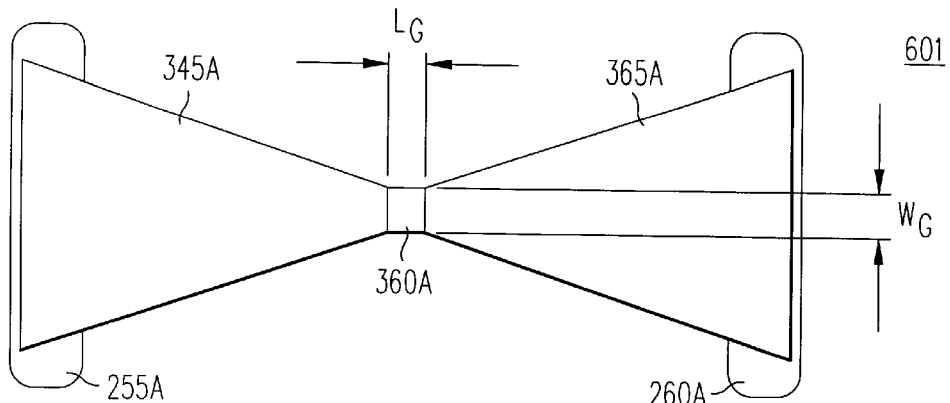
FIG. 21A is a simplified plan view of a portion of the upper surface of the head assembly showing one pole piece pair thereof.

In the top plan view of head assembly 600 of FIG. 20A, each of the three heads of head assembly 600 exhibits a different head geometry. It is noted that the geometry of the magnetic poles and the geometry of the gap region of a head together determine the geometry of that particular head. In this particular example, head 601 exhibits a substantially symmetric head geometry, namely a geometry wherein poles 345A and 365A have the same shape. The gap region 360A of head 601 is centered between side poles 255A and 260A. While other pole shapes may be used, in this example, poles 345A and 365A are each somewhat triangular and together exhibit a substantially bow-tie like shape as seen in FIG. 21A. FIG. 21A is a simplified top plan view of a portion of the upper surface of head 601. The track width, $W_G$, of head 601 is approximately 18 microns and the gap length, $L_G$, is approximately 0.8 microns. Head 601 is compatible with magnetic media exhibiting a track width of approximately 18 microns in this example.

Figure 21B:
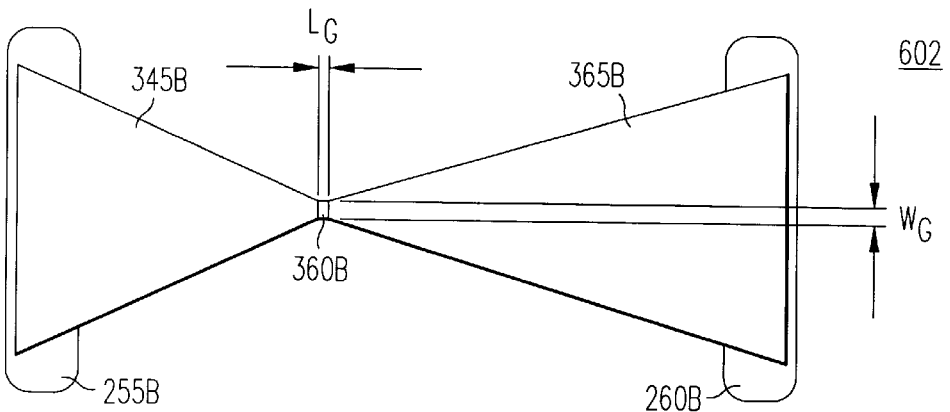
FIG. 21B is a simplified plan view of another portion of the upper surface of the head assembly showing another pole piece pair thereof.
Figure 21C:
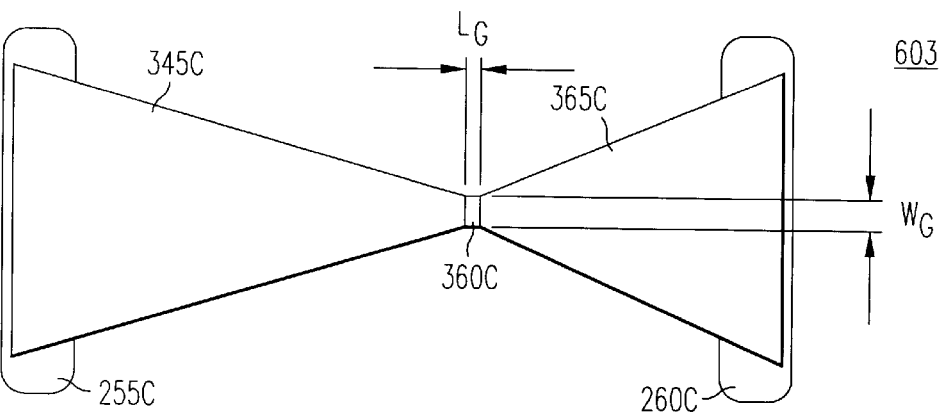
FIG. 21C is a simplified plan view of still another portion of the upper surface of the head assembly showing yet another pole piece pair thereof.

FIG. 21B and 21C are simplified top plan views of a portion of the upper surfaces of heads 602 and 603, respectively. Heads 602 and 603 are asymmetric heads in that the gap regions of these heads are not centered between the side poles of each head. Rather, the gap region of each head is offset with respect to a center line (not shown) half way between the side poles of the head. The track width, $W_G$, of head 602 is approximately 8 microns and the gap length, $L_G$ is approximately 0.3 microns. Head 602 is compatible with magnetic media exhibiting a track width of approximately 8 microns in this example. In comparison, head 603 exhibits a track width, $W_G$, of approximately 12 microns and a gap length, $L_G$, of approximately 0.5 microns. Head 603 is compatible with magnetic media exhibiting a track width of approximately 12 microns in this particular example. The particular track widths, gap lengths and media track sizes are given for purposes of illustration and should not be taking as being limiting. It should be appreciated that these values will vary according to the particular application.

While in the example of head assembly 600 depicted in FIG. 20A three different geometry heads are shown, one of these heads can be omitted to form a head assembly with two heads wherein each head exhibits a different pole piece geometry. A structure is also contemplated wherein the head assembly 600 includes three or more heads and at least two of the heads of the head assembly exhibit different pole piece geometries.

While a thin film magnetic head assembly has been described above, it is clear that a method of fabricating such a thin film magnetic head assembly is also disclosed. Briefly, a method of fabricating a thin film magnetic head assembly on a substrate is provided which includes the step of forming an insulative main body on the substrate from a plurality of layers of insulative material. The method includes the step of forming a plurality of magnetic yokes on the substrate and within the main body during the forming of the insulative main body. The method also includes the step of forming a plurality of coil structures within the main body and magnetically coupled to respective magnetic yokes. The method further includes the step of forming a pedestal of insulative material situated atop the main body and exhibiting a lateral dimension less than that of the main body, the pedestal protruding upwardly away from the main body and substrate. In accordance with the method, the step of forming a plurality of magnetic yokes step further includes forming each magnetic yoke to include a pole piece pair situated atop the pedestal, each pole piece pair including first and second magnetic pole pieces. Each magnetic yoke extends through the pedestal to integrally couple to its respective pole piece pair, a respective gap region being formed between the first and second pole pieces of each pole piece pair. The method provides that a plurality of the magnetic yokes include pole piece pairs which exhibit different pole piece geometries.

The foregoing has described a thin film magnetic head assembly which includes a plurality of heads exhibiting different pole piece geometries. Advantageously, the disclosed thin film head achieves a very narrow gap width for recording and playback on high density magnetic media and further includes a wider gap width for recording and playback of less dense magnetic media. The thin film head assembly can be fabricated without excavating recesses within the substrate to contain respective heads. Moreover, the disclosed thin film head can be fabricated in large quantities using thin film semiconductor fabrication equipment.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A thin film magnetic head assembly having a plurality of thin film magnetic heads, the thin film head assembly comprising:

a substrate;

an insulative main body positioned on the substrate and extending to a lateral edge;

a plurality of magnetic yokes positioned on the substrate and laterally enclosed within the insulative main body;

a plurality of coil structures enclosed within the insulative main body, ones of the plurality of coil structures being magnetically coupled to respective ones of the plurality of magnetic yokes, the magnetically-coupled coils and magnetic yokes corresponding to ones of a plurality of thin film magnetic heads;

a common pedestal of insulative material common to the plurality of thin film magnetic heads, the common pedestal positioned on the insulative main body and extending across the plurality of thin film magnetic heads to a lateral edge that extends interior to the lateral edge of the insulative main body, the pedestal having a plurality of apertures directly overlying the respective plurality of magnetic yokes, the pedestal protruding away from the insulative main body and substrate; and the plurality of magnetic yokes including a pole piece pair positioned on the common pedestal, the pole piece pair including first and second magnetic pole pieces, at least one of the plurality of magnetic yokes extending through at least two of the plurality of apertures of the common pedestal to integrally couple to the pole piece pair, a gap region being formed between the first and second pole pieces of the pole piece pair, the pole piece pair and the gap region being supported by the common pedestal.

2. The thin film magnetic head assembly of claim 1 wherein the plurality of magnetic yokes include magnetic yokes that have different pole piece geometries by virtue of the pole piece pairs having different gap widths.

3. The thin film magnetic head assembly of claim 1 wherein the plurality of magnetic yokes include magnetic yokes that have different pole piece geometries by virtue of the pole piece pairs having different gap lengths.

4. The thin film magnetic head assembly of claim 1 further comprising a frame surrounding the insulative pedestal to provide structural integrity to the insulative pedestal.

5. The thin film magnetic head assembly of claim 1 wherein a layer of diamond-like carbon (DLC) wear material is positioned on the insulative pedestal and encloses a plurality of pole piece pairs.

6. The head apparatus of claim 5 wherein the DLC layer has a substantially rectangular geometry.

7. The thin film magnetic head assembly of claim 1 wherein the insulative main body has a substantially circular geometry.

8. The thin film magnetic head assembly of claim 1 wherein the pedestal has a substantially rectangular geometry.

9. The thin film magnetic head assembly of claim 1 wherein the insulative main body includes a plurality of layers of insulative material from which the main body is built up, the layers of insulative material being oriented generally parallel with respect to the substrate.

10. The thin film magnetic head assembly of claim 1 wherein each magnetic yoke includes first and second side poles having a plurality of layers of magnetic material built up within the insulative main body, the first and second side poles being oriented generally normal with respect to the substrate.

11. The thin film magnetic head of claim 1 wherein the gap region of each pole piece pair exhibits a substantially L-shaped cross section.

12. A thin film magnetic head assembly according to claim 1 wherein:

the plurality of magnetic yokes include magnetic yokes that have pole piece pairs with different pole piece geometries.

* * * * *